INVENTOR.
Imre Molnar
BY
Smith, Olsen & Baird
Attys.

Jan. 4, 1955 I. MOLNAR 2,698,881
TELEPHONE SYSTEM
Filed Oct. 14, 1952 13 Sheets-Sheet 2

INVENTOR.
Imre Molnar
BY
Smith, Olsen & Baird
Attys.

INVENTOR.
Imre Molnar
BY
Smith, Olsen & Baird
Attys.

Jan. 4, 1955

I. MOLNAR 2,698,881

TELEPHONE SYSTEM

Filed Oct. 14, 1952

13 Sheets-Sheet 4

INVENTOR.
Imre Molnar
BY
Smith, Olsen + Baird
Attys.

INVENTOR.
Imre Molnar
BY
Smith, Olsen + Baird
Attys.

INVENTOR.
Imre Molnar
BY
Smith, Olsen & Baird
Attys.

Jan. 4, 1955 I. MOLNAR 2,698,881

TELEPHONE SYSTEM

Filed Oct. 14, 1952 13 Sheets-Sheet 7

INVENTOR.
Imre Molnar
BY
Smith, Olsen & Baird
Attys.

INVENTOR.
Imre Molnar
BY
Smith, Olsen & Baird
Attys.

INVENTOR.
Imre Molnar
BY
Smith, Olsen & Baird
Attys.

INVENTOR.
Imre Molnar
BY
Smith, Olsen & Baird
Attys.

INVENTOR.
Imre Molnar
BY
Smith, Olsen + Baird
Attys.

Jan. 4, 1955

I. MOLNAR 2,698,881

TELEPHONE SYSTEM

Filed Oct. 14, 1952

13 Sheets-Sheet 12

INVENTOR.
Imre Molnar
BY
Smith, Olsen & Baird
Attys.

INVENTOR.
Imre Molnar
BY
Smith, Olsen & Baird
Attys.

United States Patent Office 2,698,881

Patented Jan. 4, 1955

2,698,881

TELEPHONE SYSTEM

Imre Molnar, Chicago, Ill., assignor to Automatic Electric Laboratories, Inc., Chicago, Ill., a corporation of Delaware Application October 14, 1952, Serial No. 314,652

29 Claims. (Cl. 179—18)

Figure 1:
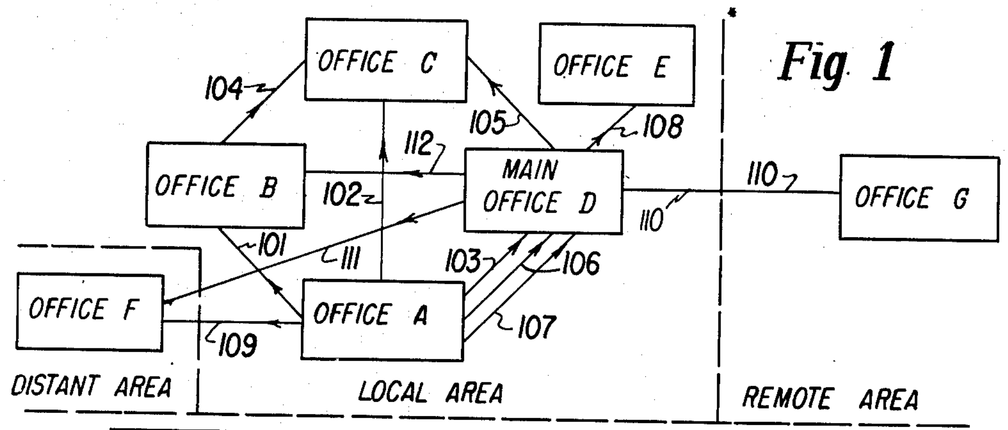

The present invention relates to telephone systems and more particularly to improved directors or register-senders therefor.

It is a general object of the present invention to provide a director for an automatic telephone system of the Siemens-Halske Class A type that is of improved and simplified connection and arrangement.

Another object of the invention is to provide in a telephone system, a plurality of directors and an interrupter common to the directors, wherein the interrupter controls the directors to bring about the sending from the interrupter over the outgoing channels of the directors of series of impulses in accordance with digits registered in the directors.

Another object of the invention is to provide a director that incorporates a route mechanism of the primary-secondary motions type that is arranged for drop-back primary operation, so that the registration of two-digit and three-digit called office codes may be accomplished in a simple and ready manner.

Another object of the invention is to provide a director that incorporates an improved arrangement for selectively setting the route mechanism thereof in response to one-digit toll call codes and to two-digit special service call codes and to three-digit regular call codes.

Another object of the invention is to provide a director that incorporates an improved arrangement for selectively controlling the extension of calls based upon the registration of assigned and unassigned called office codes.

Another object of the invention is to provide a director that incorporates an improved arrangement for selectively controlling associated zone metering apparatus provided in the links over which the calls are extended and based upon the registration of metered and non-metered called office codes.

Another object of the invention is to provide a director that incorporates an improved arrangement of a route mechanism including two wiper sets, wherein the two wiper sets are selected respectively based upon the registered called office codes, and the routing digits sent are dependent upon the particular one of the wiper sets that is selected.

A further object of the invention is to provide a director that incorporates an improved and simplified arrangement for rerouting calls over different outgoing channels in the event the first choice outgoing channel includes an all-trunks busy condition.

A further object of the invention is to provide a director incorporating an improved arrangement for bringing about the release thereof in the event of the improper registration of a called office code.

A further object of the invention is to provide a director incorporating an improved arrangement accommodating the transmission of cumulative digits so that a total number of digits may be registered and transmitted therefrom that is in excess of the total number of individual digit registers provided therein.

A still further object of the invention is to provide a director incorporating a primary-secondary motions routing switch that includes a plurality of wipers, wherein the contact bank associated with one of the wipers is cross-multipled in the secondary direction to accommodate recapture of the primary operating digit, and wherein the contact bank associated with another of the wipers is cross-multipled in the primary direction to accommodate the recapture of the secondary operating digit.

A still further object of the invention is to provide a director incorporating an improved arrangement of a condenser and a charging circuit therefor including the windings of a set of digit relays in a digit register, whereby the digit relays may be selectively operated via a charging circuit for the condenser in various combinations to register the various values of a digit.

A still further object of the invention is to provide the combination of a director, an interrupter, and sending and marking paths extending therebetween; whereby impulses transmitted from the interrupter over the sending path may be selectively controlled by the impulses transmitted from the interrupter over the marking paths in order to cause the director to send variable series of switch-setting impulses over the outgoing channel therefrom corresponding to digits of variable values registered in the director.

Further features of the invention pertain to the particular arrangement of the circuit elements of the telephone system, whereby the above-outlined and additional operating features thereof are attained.

*Section 1.—The general arrangement of the telephone system*

Figure 2:
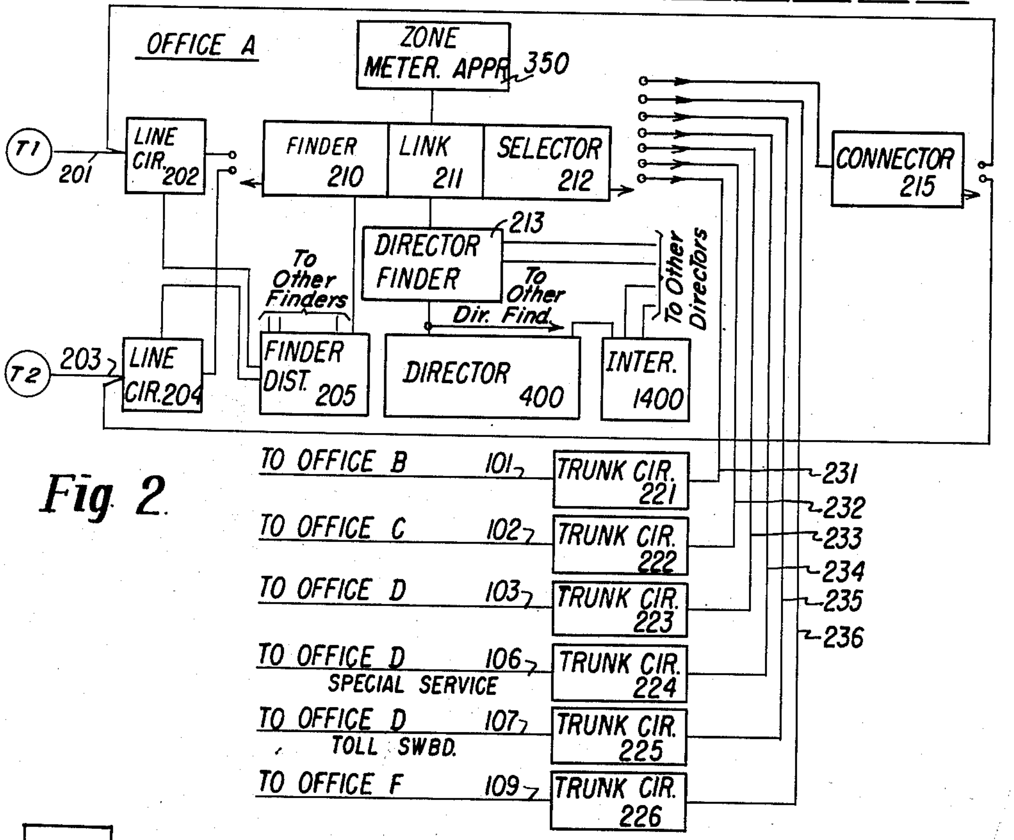
Figure 15:
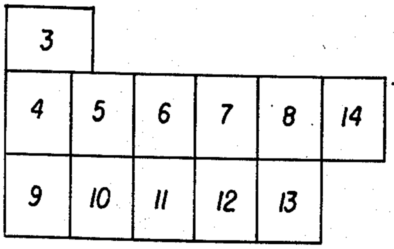
Figures 14, 14A:
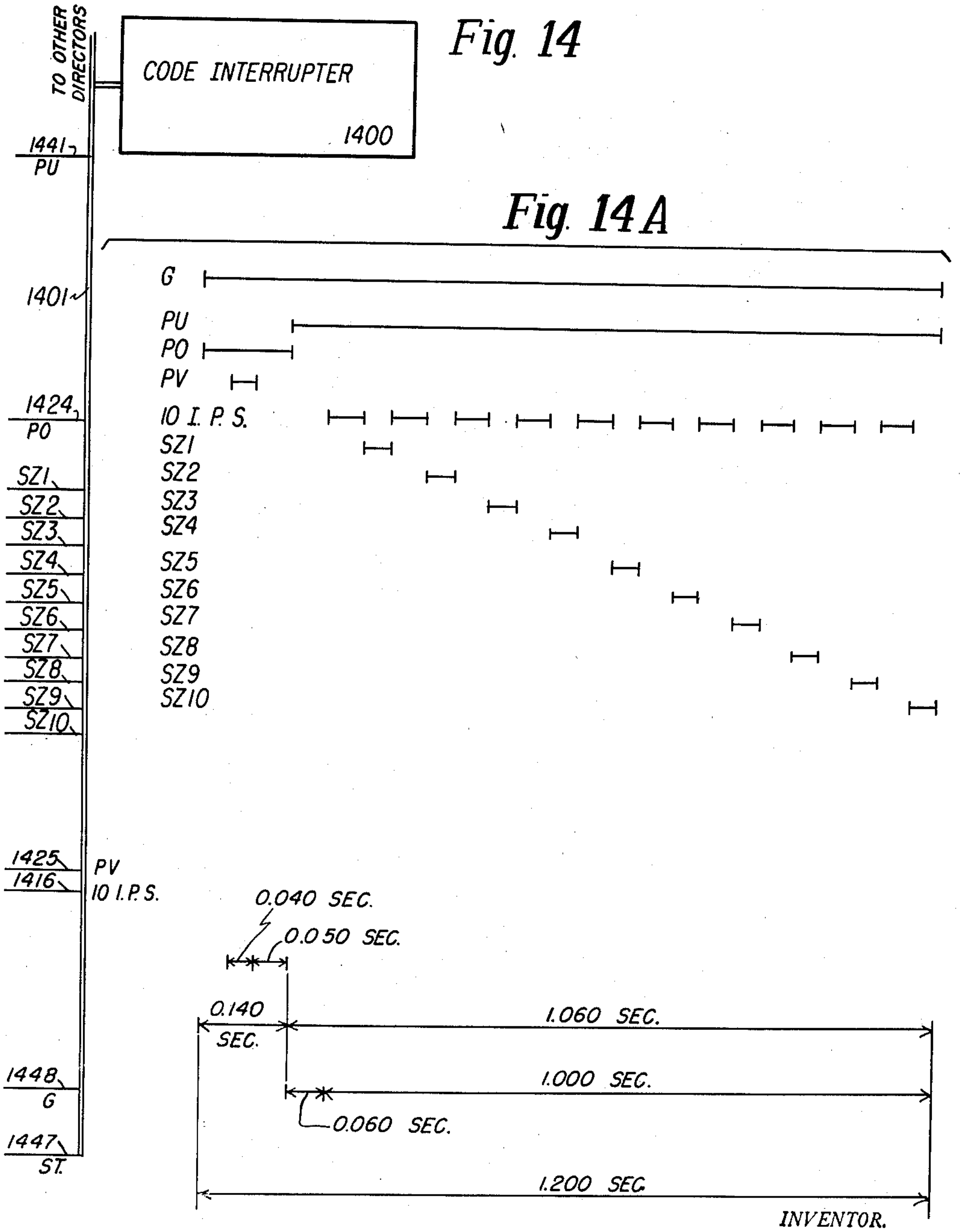

The invention, both as to its organization and method of operation, together with further objects and advantages thereof, will best be understood by reference to the following specification taken in connection with the accompanying drawings, in which Figure 1 is a schematic diagram of a portion of the area served by a telephone system embodying the present invention; Fig. 2 is a schematic diagram of certain of the apparatus incorporated in one of the offices of the telephone system; Figs. 3 to 14, inclusive, taken together, illustrate the details of certain of the apparatus incorporated in the office shown in Fig. 2; Fig. 14A comprises a chart indicative of the time relation of impulses transmitted from an associated code interrupter; and Fig. 15 illustrates the mode of combining Figs. 3 to 14, inclusive, to form a unified diagram.

Figure 3:
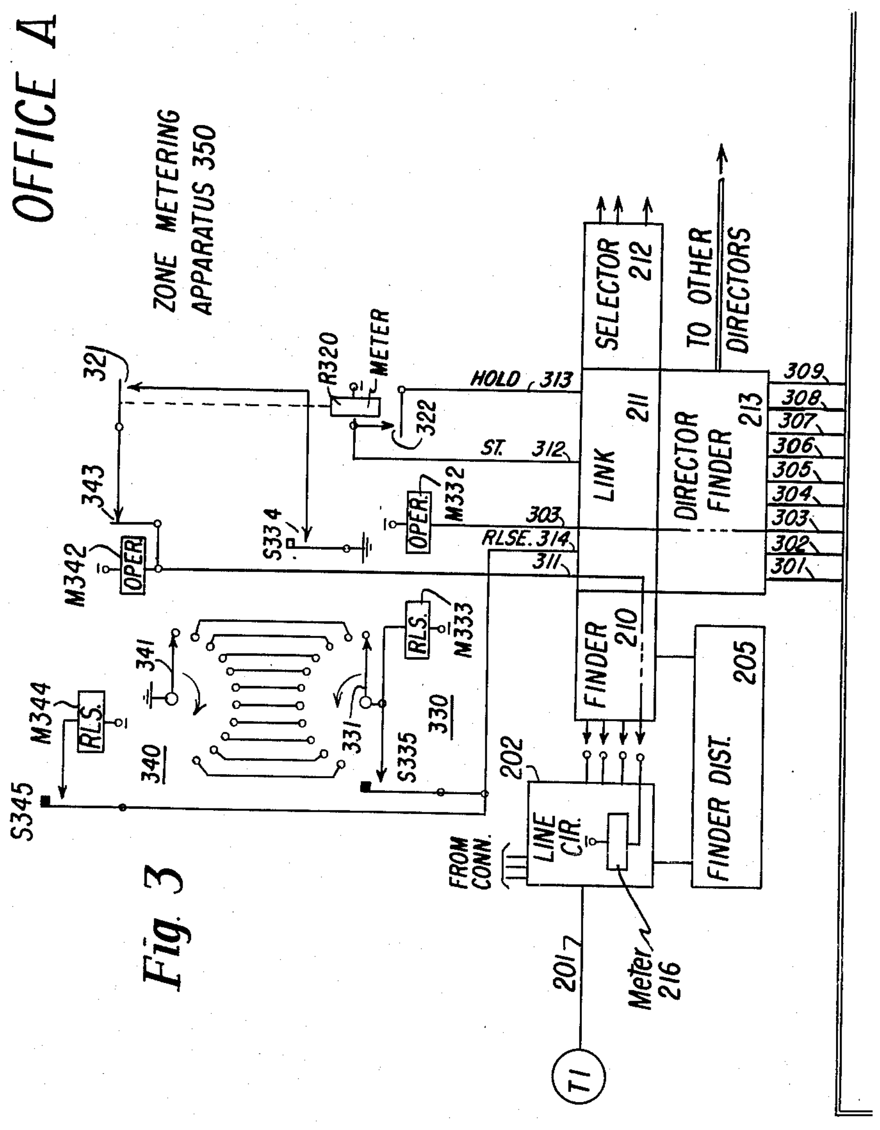
Figure 4:
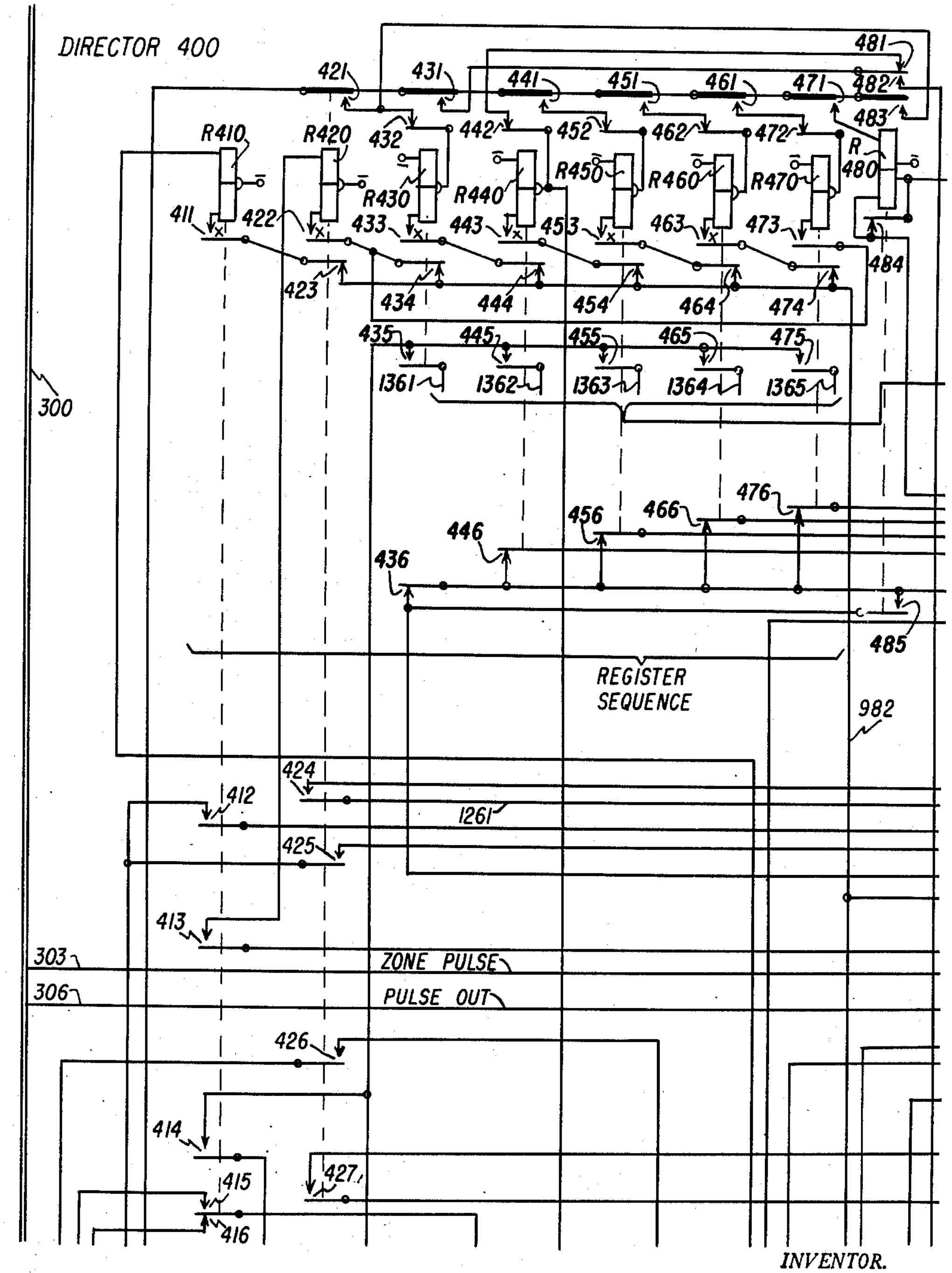
Figure 5:
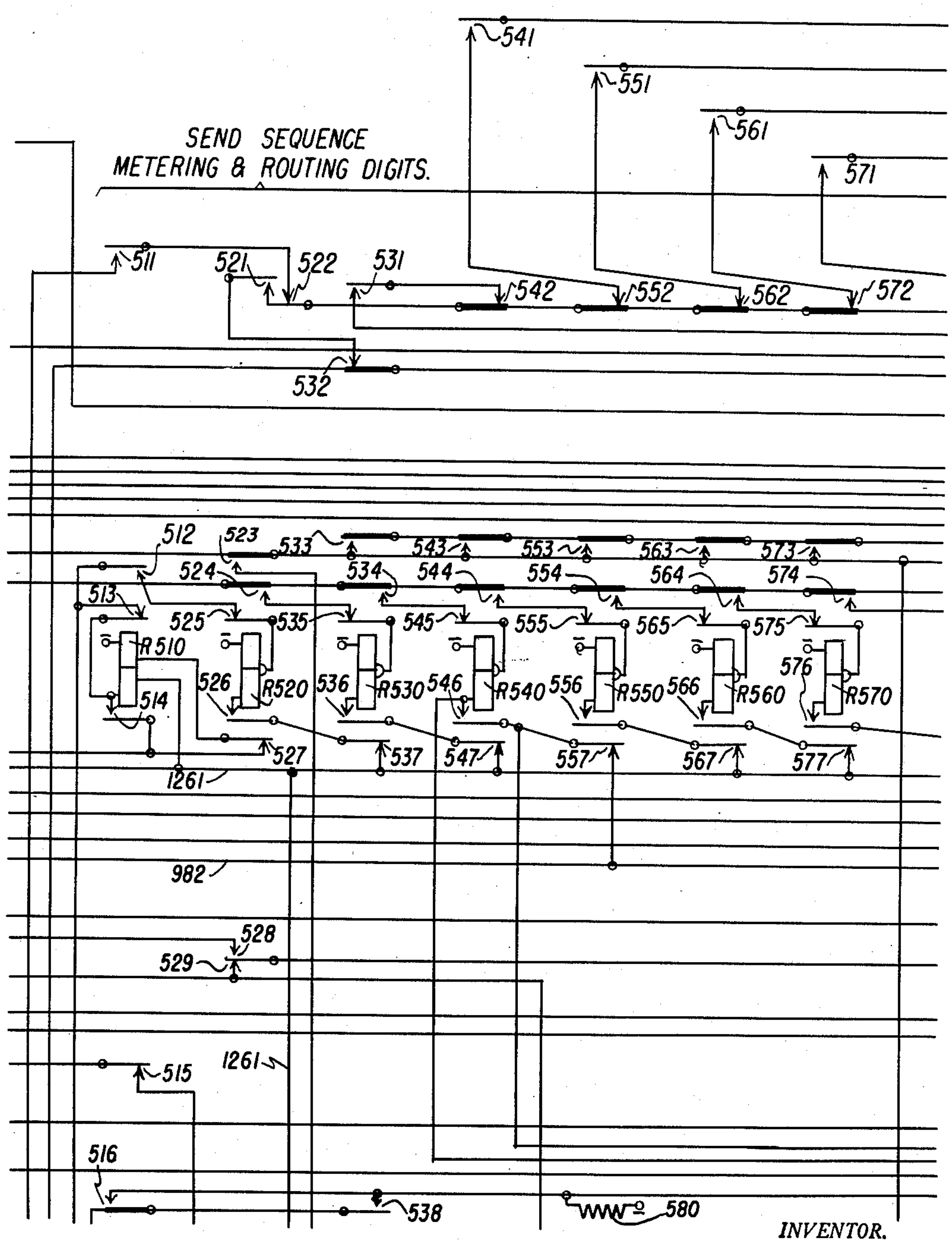
Figure 6:
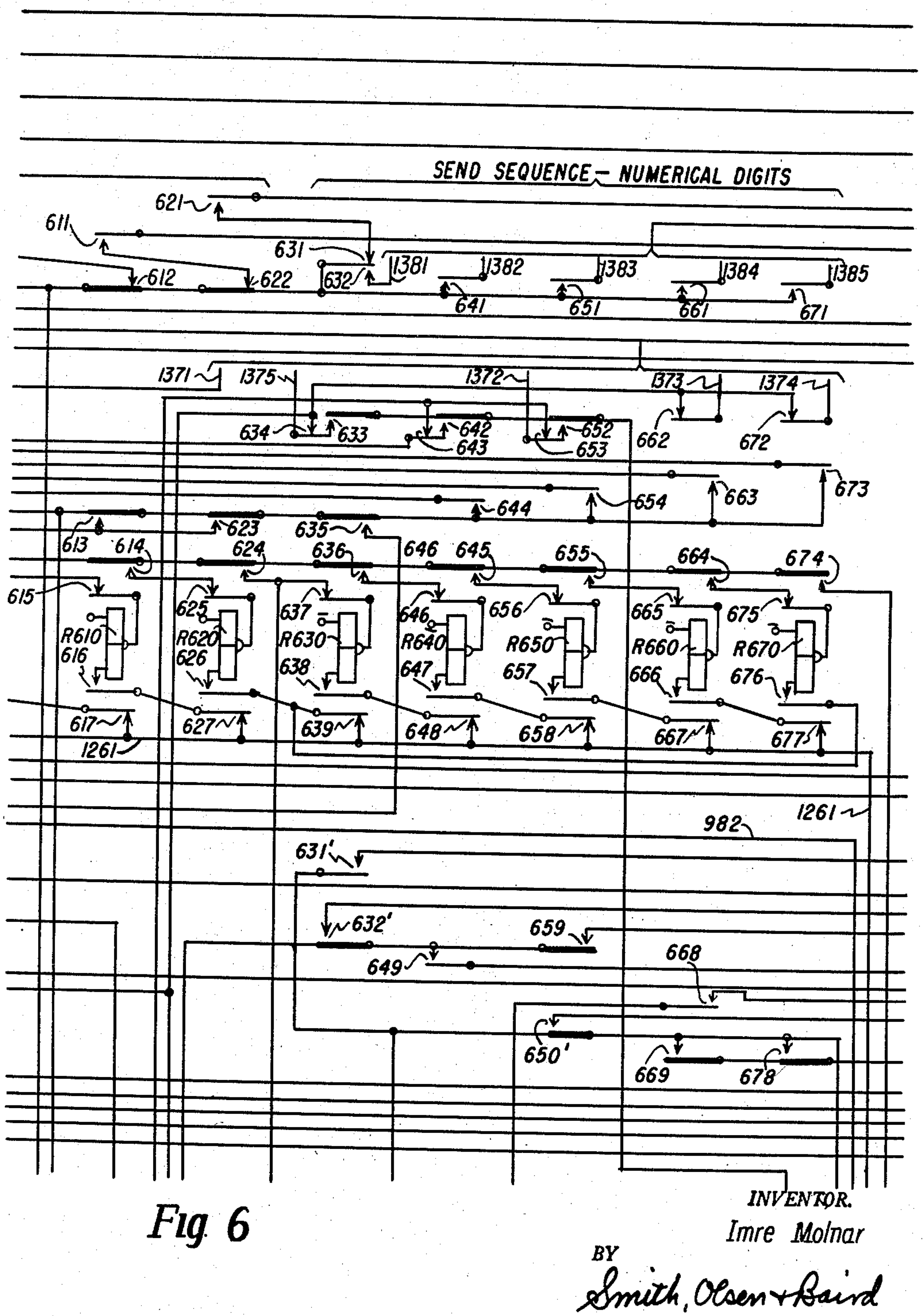
Figure 7:
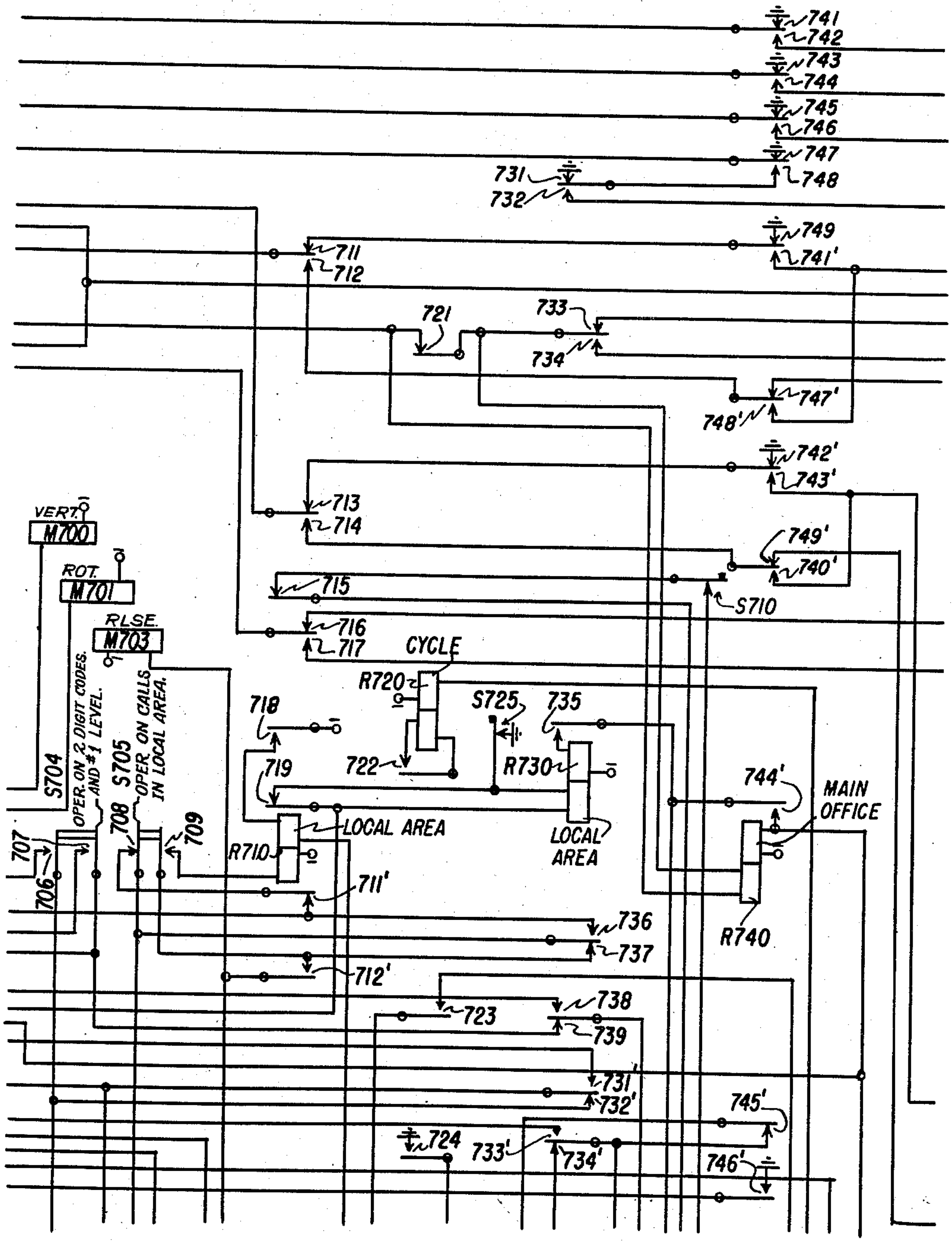
Figure 8:
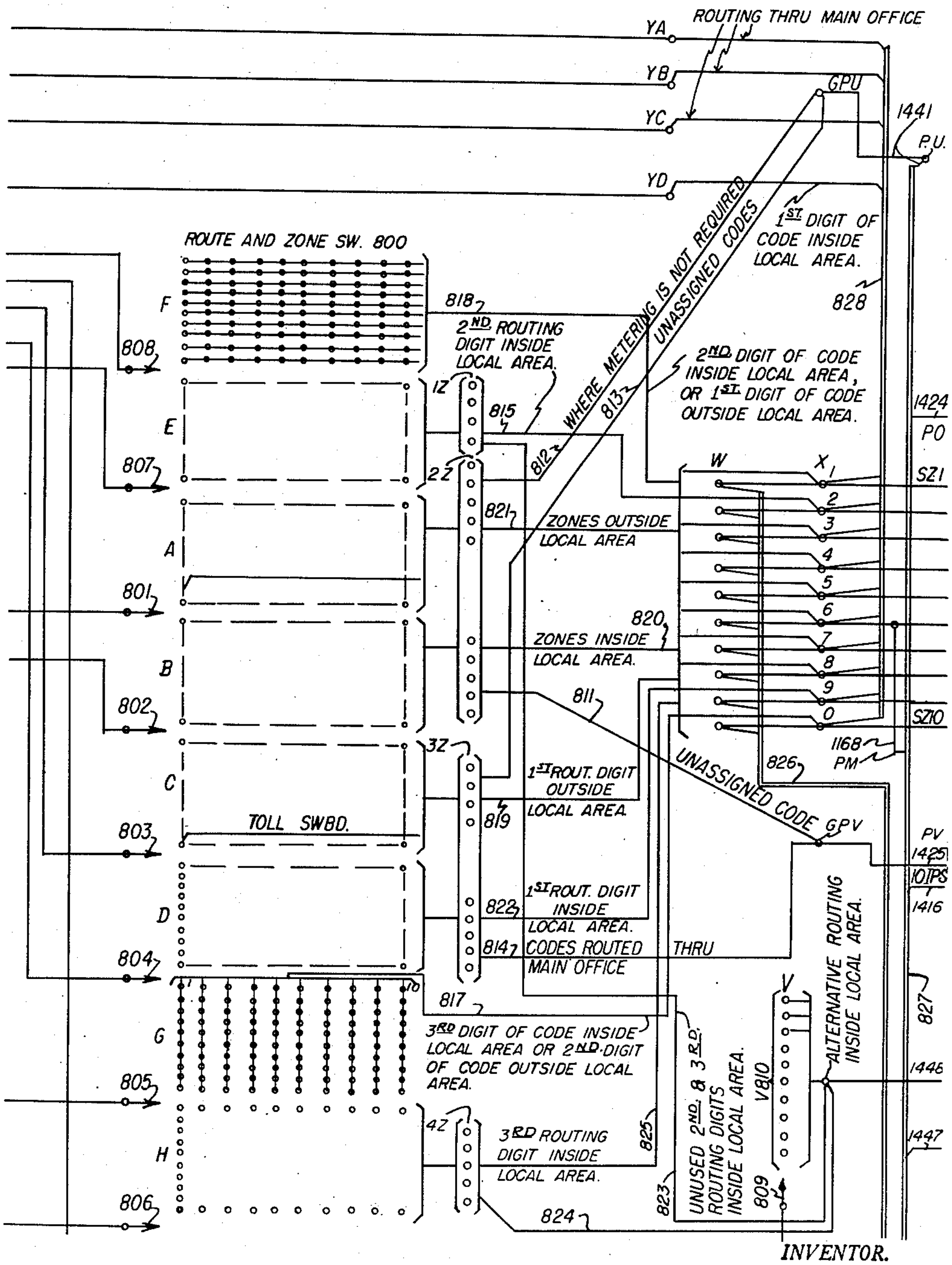
Figure 9:
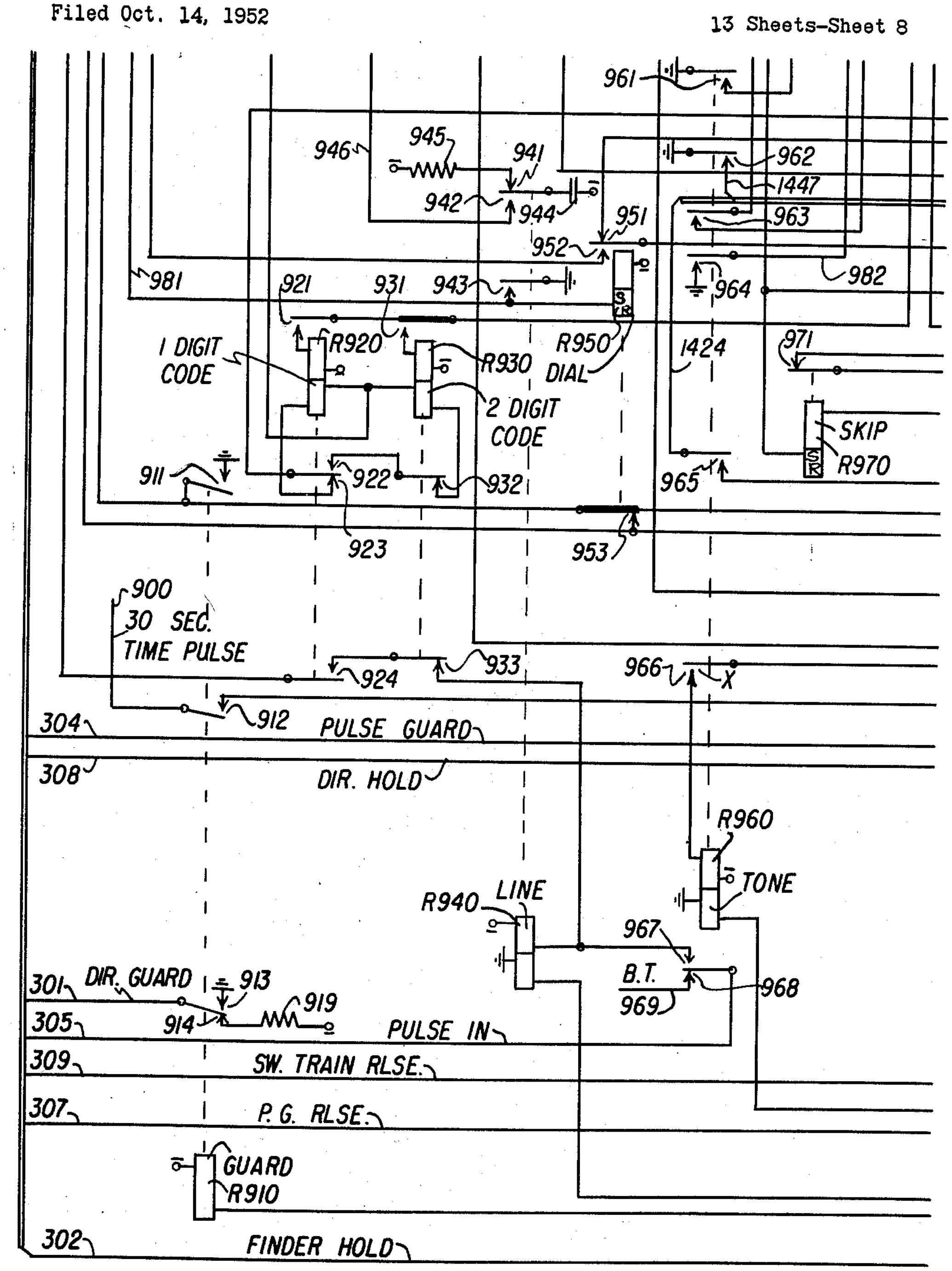
Figure 10:
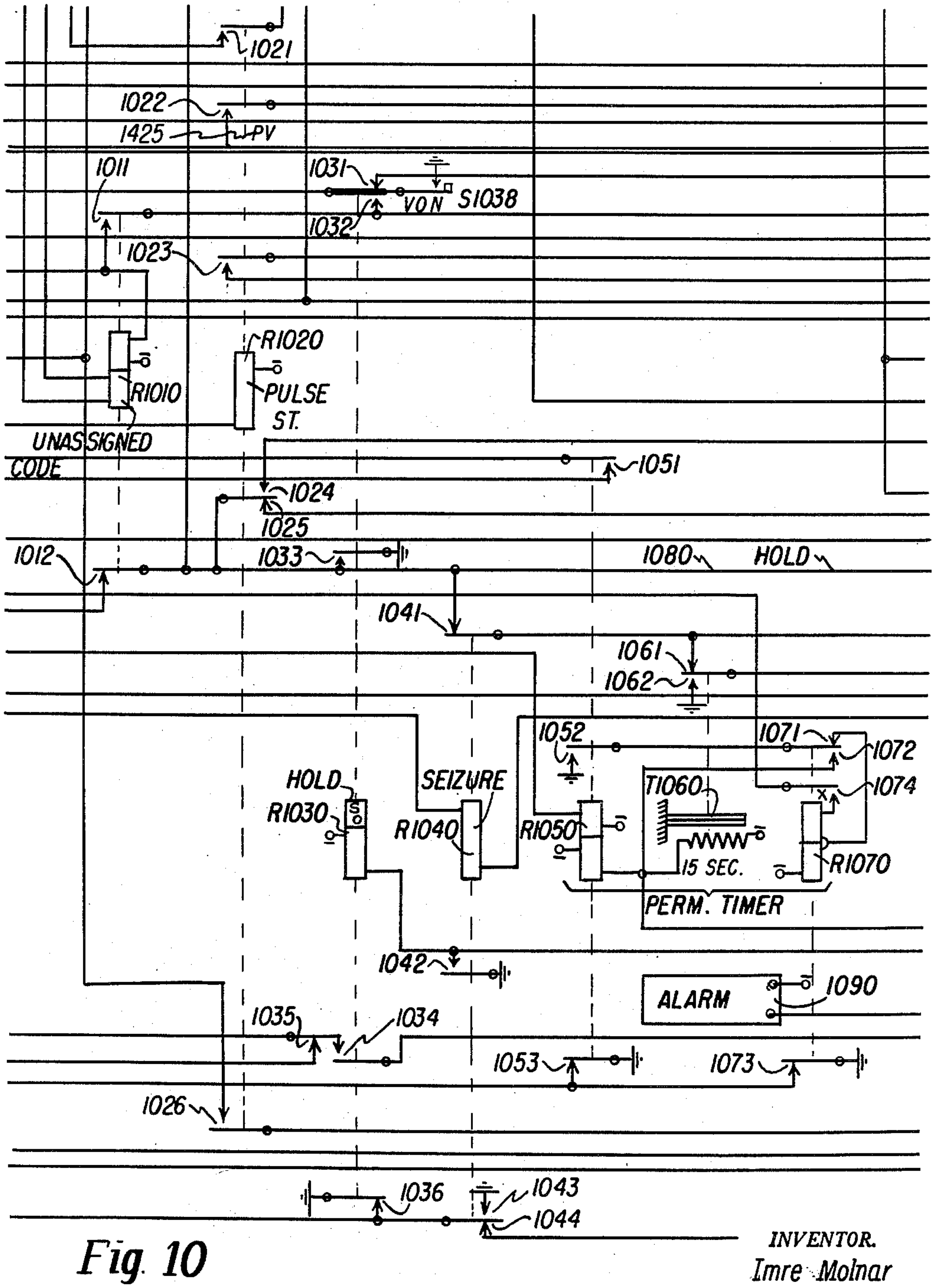
Figure 11:
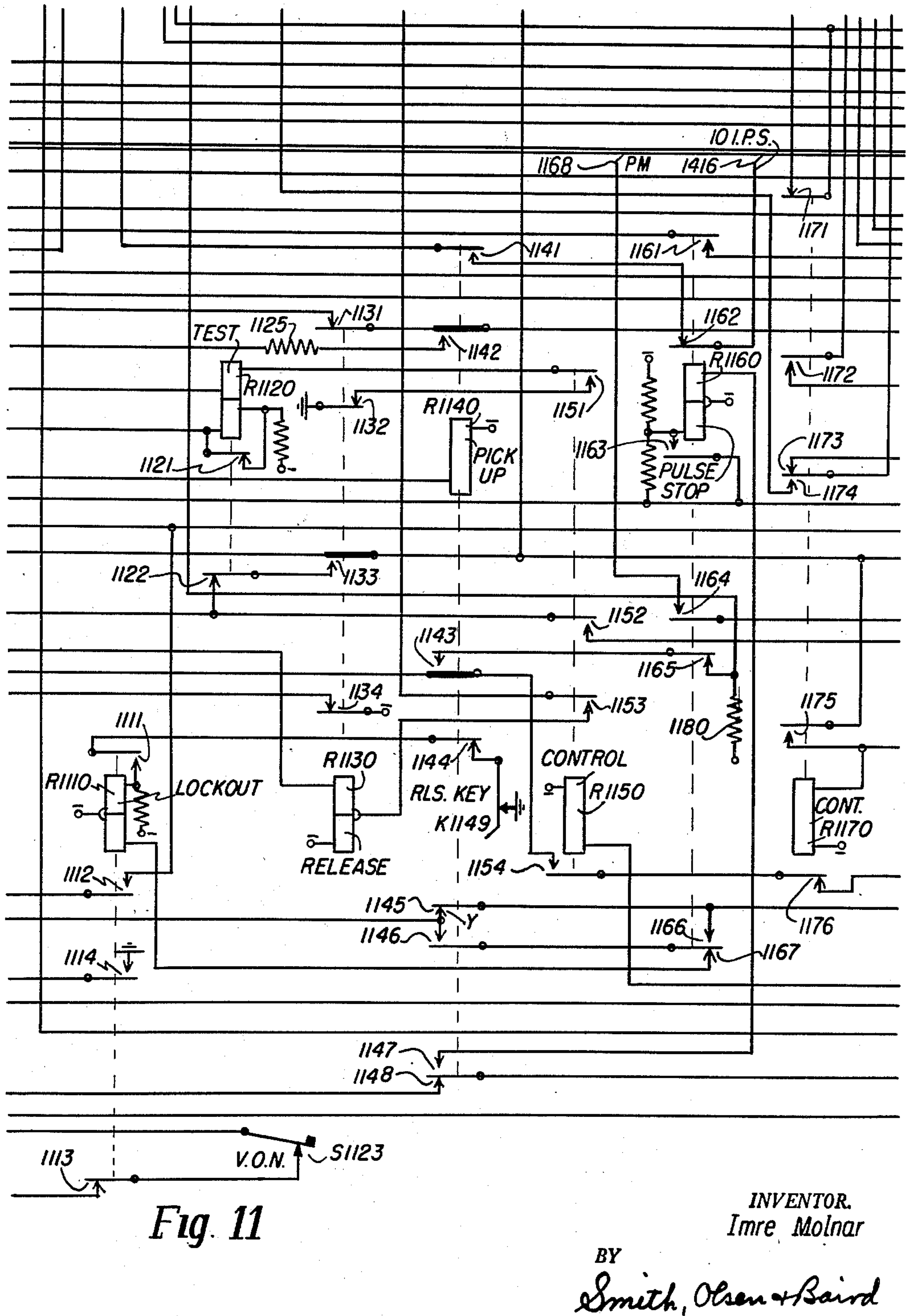
Figure 12:
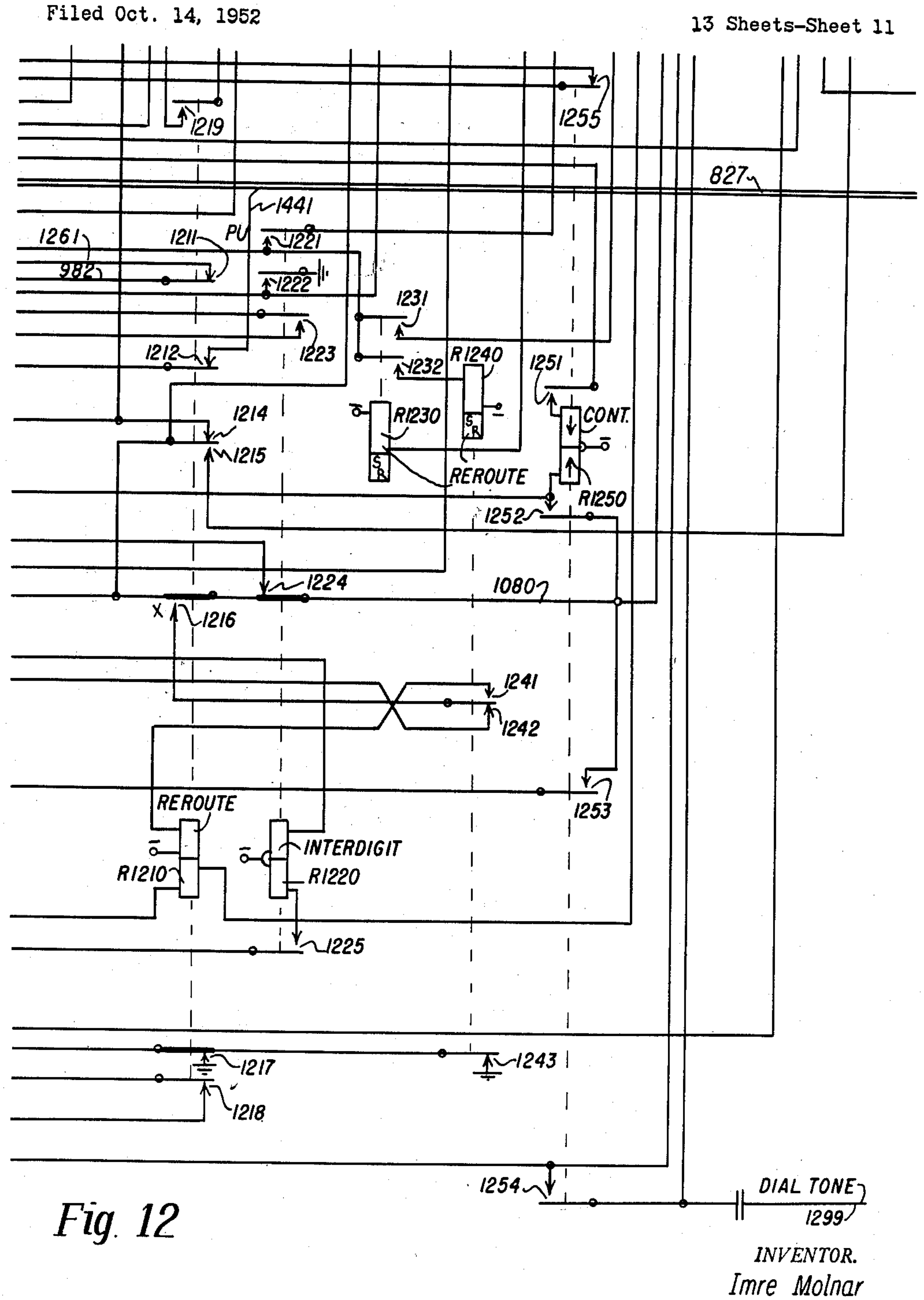
Figure 13:
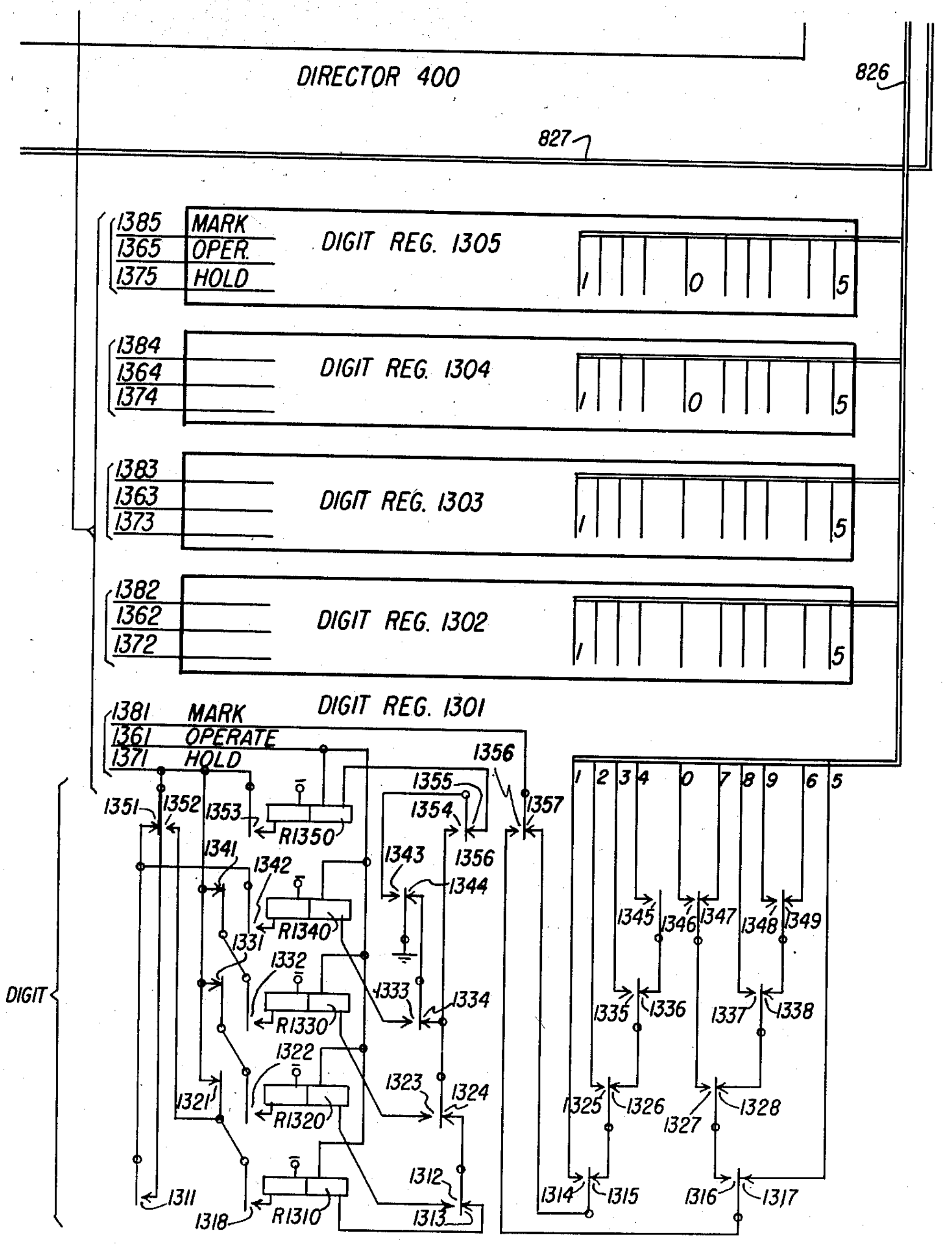

More particularly, Fig. 3 illustrates the details of zone metering apparatus incorporated in one of the finder-link-selector apparatus provided in the office A of the telephone system; and Figs. 4 to 13, inclusive, illustrate the details of one of the directors incorporated in the office A of the telephone system and embodying the features of the present invention.

Referring now more particularly to Fig. 1, the telephone system there illustrated serves a number of areas, three of which are designated: local, distant and remote. Each of the areas comprises a main office and one or more other offices; and as illustrated, the local area comprises the main office D and the other offices A, B, C and E; the distant area comprises at least the office F and the remote area comprises at least the office G. The various offices in each area are interconnected by groups of incoming and outgoing trunk lines; and in the interest of simplicity, only the groups of outgoing trunk lines from the office A and the pertinent groups of outgoing trunk lines from the other offices have been illustrated. For example, the office A is connected to the office B by a group of outgoing trunk lines 101, etc.; the office A is connected to the office C by a group of outgoing trunk lines 102, etc.; the office A is connected to the office F by a group of outgoing trunk lines 109, etc.; the office B is connected to the office C by a group of outgoing trunk lines 104, etc.; the main office D is connected to the office F by a group of outgoing trunk lines 111, etc.; the main office D is connected to the office B by a group of outgoing trunk lines 112, etc.; the main office D is connected to the office C by a group of outgoing trunk lines 105, etc.; the main office D is connected to the office E by a group of outgoing trunk lines 108, etc.; the main office D is connected to the office G by a group of outgoing trunk lines 110, etc.; and the office A is connected to the main office D by three groups of outgoing trunk lines 103, etc., 106, etc., and 107, etc. The outgoing trunk lines 103, etc., extending from the office A to the main office D are employed for regular switching service; the outgoing trunk lines 106, etc., extending from the office A to the main office D are employed for special service; and the outgoing trunk lines 107, etc., extending from the office A to the main office D are employed for toll service.

The telephone system is of the automatic Siemens-Halske Class A type and each office thereof comprises subscriber substations and director-controlled automatic switching apparatus; whereas each main office further comprises an operator switchboard arranged to render both special and toll services.

As illustrated in Fig. 2, the office A of the telephone system comprises a plurality of subscriber substations, including the subscriber substations T1 and T2, and automatic switching apparatus, including a plurality of switching units of the finder-link-selector type, as well as a plurality of groups of connectors 215, etc. The subscriber substations T1, T2, etc., are provided with subscriber lines 201, 203, etc., extending thereto that are terminated by corresponding line circuits 202, 204, etc., that are associated with a finder distributor 205. Each of the switching units mentioned is identical to that illustrated, which comprises a finder 210, a selector 212, and an interposed link 211, as well as zone metering apparatus 350, and a director finder 213, also operatively associated with the link 211. Also the office A comprises a group of directors, one of which is indicated at 400, and an interrupter 1400 commonly associated with the directors 400, etc. The finder distributor 205 has access to the various finders 210, etc.; and the director finders 213, etc., have access to the various directors 400, etc.

Also, as illustrated in Fig. 2, the outgoing trunk lines 101, 102, 103, 106, 107, 109, etc., are terminated by individual trunk circuits 221, 222, 223, 224, 225, 226, etc., that terminated incoming trunks 231, 232, 233, 234, 235, 236, etc. Moreover, one of the groups of connectors comprises the individual connector 215 that has access to the subscriber lines 201 and 203, respectively extending to the subscriber substations T1 and T2. In the arrangement, the finders 210, etc., have access to the subscriber lines 201, 203, etc., and the selectors 212, etc., have access to the trunks 231, 232, 233, 234, 235, 236, etc., and to the connectors 215, etc.

*Section 2.—The apparatus incorporated in the telephone system*

In the several offices A, etc., the subscriber substations T1, T2, etc., are provided with conventional substation apparatus, and the line circuits 202, 203, etc., are of any conventional lockout-metering type. Moreover, the finder distributors 205, etc., and the director finders 213, etc., are of any conventional type. Fundamentally, the interrupter 1400 may be of any suitable type provided it is productive of the impulses in accordance with the pattern illustrated in Fig. 14A, as explained more fully hereinafter. Finally, the finder 210, etc., the links 211, etc., the selectors 212, etc., and the connectors 215, etc., are of conventional Siemens-Halske, Class A type; and the trunk circuits 221, 222, etc., are of any conventional type.

As illustrated in Fig. 3, the zone metering apparatus 350 individually associated with the link 211 comprises a meter relay R320 and two stepping switches 330 and 340 of the minor type. The switch 330 comprises a wiper 331 provided with an associated contact bank, a stepping magnet M332 operative to drive the wiper 331 step by step in the counterclockwise direction away from its normal rotary position, and a release magnet M333 for releasing the wiper 331 and for returning it back into its normal rotary position. Also associated with the wiper 331 are two sets of switching springs S334 and S335 that are operated when the wiper 331 is driven away from its normal rotary position. Similarly, the switch 340 comprises a wiper 341 provided with an associated contact bank, a stepping magnet M342 operative to drive the wiper 341 step by step in the clockwise direction away from its normal rotary position, and a release magnet M344 for releasing the wiper 341 and for returning it back into its normal rotary position. Also associated with the wiper 341 is a set of switch springs S345 that is operated when the wiper 341 is driven away from its normal rotary position. In passing, it is noted that the switch 330 is selectively operated away from its normal position through the link 211 under the control of one of the directors 400, etc., a number of steps corresponding to an appropriate zone charge for a call between a calling subscriber substation in the office A and a called subscriber substation in any of the areas. Subsequently incident to the release of the established connection, the switch 340 is operated a number of steps corresponding to the number of steps of operation of the switch 330 so as to produce corresponding operations of the meter in the line circuit 202, etc., individual to the calling subscriber substation T1, etc.

Also, as illustrated in Fig. 3, the line circuit 202 individual to the subscriber line 201 is provided with a meter 216 that is adapted to be operated under the control of the zone metering apparatus 350, etc., individually associated with the various links 211, etc., and dependent upon the extent of an established connection completed from the calling subscriber substation T1 connected to the subscriber line 201.

Preferably, each of the directors in the several offices A, etc., are identical to the director 400 illustrated in Figs. 4 to 13, inclusive. The director 400 provided in the office A comprises a relay group including seven register sequence relays R410, R420, R430, R440, R450, R460 and R470, a control relay R480, a first group of nine send sequence relays R510, R520, R530, R540, R550, R560, R570, R610 and R620, a second group of five send sequence relays R630, R640, R650, R660 and R670, two local area relays R710 and R730, a cycle relay R720, a main office relay R740, a guard relay R910, a one-digit code relay R920, a two-digit code relay R930, a line relay R940, a dial relay R950, a tone relay R960, a skip relay R970, an unassigned code relay R1010, a pulse start relay R1020, a hold relay R1030, a seizure relay R1040, three permanent timer relays R1050, T1060 and R1070, a lockout relay R1110, a test relay R1120, a release relay R1130, a pickup relay R1140, a control relay R1150, a pulse stop relay R1160, a control relay R1170, three reroute relays R1210, R1230 and R1240, an interdigit relay R1220, and a control relay R1250. The permanent timer relay T1060 is of the thermostatic type having a timing period of 15 seconds, and is employed for a purpose more fully explained hereinafter. Further, the director 400 comprises five individual numerical digit registers 1301, 1302, 1303, 1304 and 1305 that are of identical connection and arrangement. Specifically, the digit register 1301 illustrated comprises five individual digit relays R1310, R1320, R1330, R1340 and R1350 that are operative individually and in certain combinations for the purpose of registering the individual digits 1 to 0, inclusive.

Further, the director 400 comprises a route and zone switch 800 of the Strowger type that includes eight individual wipers 801 to 808, inclusive, that are provided with individually associated contact banks arranged in ten vertically disposed levels of contact sets spaced-apart in the rotary direction, as well as a vertical control wiper 809 provided with an associated vertical control contact bank. The Strowger switch 800 comprises a vertical magnet M700 operative to drive the wiper carriage carrying the eight individual wipers 801 to 808, inclusive, step by step in the vertical direction, a rotary magnet M701 operative to drive the wiper carriage step by step in the rotary direction, and a release magnet M703 for releasing the wiper carriage and for causing it to be returned back into its normal rotary and vertical positions. Associated with the wiper carriage are four sets of switch springs S710, S725, S1123 and S1038 that are operated when the wiper carriage is driven one step in the vertical direction away from its normal vertical position. Also associated with this wiper carriage is a set of switch springs S705 that is operated when the wiper carriage is driven in the vertical direction to a predetermined level corresponding to a call in the local area; which level, in the present example, is assumed to be the level 5. Finally, associated with the wiper carriage is a set of switch springs S704 that is operated when the wiper carriage is driven in the vertical direction either to the level 1 or to another level, respectively corresponding to toll calls and to special service calls; which special service call level, in the present example, is assumed to be the level 3.

Considering now the operation of the digit register 1301, it is noted that the relays R1310, etc., are operated to register the digit 1, etc., in accordance with the following pattern:

| Digit | Relays Operated |
|---|---|
| 1 | R1310 |
| 2 | R1320 |
| 3 | R1330 |
| 4 | R1340 |
| 5 | R1350 |
| 6 | R1350, R1310 |
| 7 | R1350, R1310, R1320 |
| 8 | R1350, R1310, R1330 |
| 9 | R1350, R1310, R1340 |
| 0 | R1350, R1310, R1340, R1320 |

Before proceeding with the description of the bank multiple of the route and zone switch 800, it is noted that the common cable 1401 extending between the code interrupter 1400 and each of the directors 400, etc., comprises a number of conductors: PU(1441), PO(1424), G(1448), *St*(1447), PV(1425), 10IPS(1416) and ten individual conductors SZ1 to SZ10, inclusive. As illustrated, in Fig. 14A, in each cycle of operation of the interrupter 1400 ground potential is applied to the conductors G, PU, PO, PV, 10IPS, and SZ1 to SZ10, inclusive, in accordance with the predetermined time schedule. Specifically, ground potential is continuously applied to the G conductor for a time interval of 1.200 seconds from a start position; ground potential is continuously applied to the PO conductor for a time interval of 0.140 second from the start position; ground potential is continuously applied to the PU conductor for a time interval of 1.060 seconds following the termination of the PO pulse; ground potential is continuously applied to the PV conductor for a time interval of 0.040 second at a time preceeding the termination of the PO pulse by 0.050 second; and ground potential is ultimately applied to the 10IPS conductor and to the several SZ1, etc., conductors. Specifically, 0.060 second following the termination of the PO pulse, ground potential is applied to the 10IPS conductor for 0.060 second and at the conclusion of this pulse, ground potential is applied to the SZ1 conductor for 0.040 second. Thereafter ground potential is alternately applied to the 10IPS conductor for successive time intervals of 0.060 second and to the successive 2SZ, etc., conductors for the time intervals of 0.04 second. Thus in the arrangement, it will be understood that the ground potential applied to the 10IPS conductor comprises a 60% make interval and a 40% break interval, whereas the ground potential applied to any one of the conductors SZ1, etc., corresponds to the break interval of the impulses applied to the 10IPS conductor.

Turning now to the multiple arranged between the banks of the route and zone switch 800 incorporated in the director 400 and the banks of the other route and zone switches incorporated in the other directors in the office A, it is first pointed out that the eight banks appearing before the eight wipers of the particular route and zone switch 800 are related as follows:

| Wiper: | Bank |
|---|---|
| **801** | A |
| **802** | B |
| **803** | C |
| **804** | D |
| **805** | G |
| **806** | H |
| **807** | E |
| **808** | F |

In the bank A, the individual contacts are appropriately strapped to the pins 2Z, and the pins 2Z are appropriately strapped by the conductors 821 to the terminals X for zones outside the local area. In the bank B, the individual contacts are appropriately strapped to the pins 2Z, and the pins 2Z are appropriately strapped by the conductors 820 to the terminals X1 to X10 for zones inside the local area. Also, the pins 2Z are appropriately strapped by the conductor 812 to the terminal GPU where metering is not required; and the pins 2Z are appropriately strapped by the conductor 811 to the terminal GPV where the registered code is not assigned. In the bank C, the individual contacts are appropriately strapped to the pins 3Z, and the pins 3Z are appropriately strapped by the conductors 819 to the terminals X1 to X10 for first routing digits outside the local area. In the bank D, the individual contacts are appropriately strapped to the pins 3Z, and the pins 3Z are appropriately strapped by the conductors 822 to the terminals X1 to X10 for first routing digits inside the local area. Also the pins 3Z are appropriately strapped by the conductor 813 to the terminal GPU where the registered code is not assigned; and the pins 3Z are appropriately strapped by the conductor 814 to the terminal GPV where the registered codes indicate routing through the main office. In the bank E, the individual contacts are appropriately strapped to the pins 1Z, and the pins 1Z are appropriately strapped by the conductors 815 to the terminals X1 to X10 for second routing digits inside the local area. Also the pins 1Z are appropriately strapped by the conductor 823 to the terminal G for unused second routing digits inside the local area. In the bank H, the individual contacts are appropriately strapped to the pins 4Z, and the pins 4Z are appropriately strapped by the conductors 825 to the terminals X1 to X10 for third routing digits inside the local area. Also the pins 4Z are appropriately strapped by the conductor 824 to the terminal G for unused third routing digits inside the local area. In the bank F, the individual contacts in each level are commonly strapped together and appropriately connected by the conductor 818 to the respective terminals X1 to X10 in accordance with second digits of registered codes inside the local area or in accordance with first digits of registered codes outside the local area. In the bank G, the individual contacts in the same rotary position in the different levels are commonly strapped together and appropriately connected by the conductors 817 to the respective terminals X1 to X10 in accordance with the third digits of registered codes inside the local area or in accordance with second digits of registered codes outside the local area. In the vertical control bank V associated with the vertical control wiper 809, the individual contact sets are appropriately connected to the G terminal where alternative routing inside the local area is possible.

Moreover, the terminals X1 to X10, inclusive, are respectively connected to the terminals W1 to W10, inclusive, and to the corresponding ones of the individual conductors SZ1 to SZ10, inclusive. Further, the terminals W1 to W10, inclusive, are connected to the corresponding ten marking conductors in the cable 826 that extend to the digit registers 1301, 1302, 1303, 1304 and 1305; and the terminals X1 to X10, inclusive, are connected to the corresponding ten marking conductors in the cable 828 that extend toward the terminals YA, YB, YC and YD. The individual terminals YA, YB and YC are connected to appropriate ones of the marking conductors in the cable 828 in accordance with the three routing digits that are required through the main office D; while the terminal YD is connected to the marking conductor in the cable 828 that corresponds to the first digit of the registered code inside the local area (the fifth conductor in the present example). The GPU terminal is connected to the PU(1441) conductor; the GPV terminal is connected to the PV(1425) conductor; and the G terminal is connected to the G(1448) conductor. Also, in the cable 827, the PM(1168) conductor is connected to an appropriate one of the SZ conductors for the purpose of producing an interdigit operation; and in the arrangement illustrated, the PM conductor mentioned is connected to the SZ6 conductor.

A better understanding of the connection and arrangement of the apparatus incorporated in the telephone system will be facilitated from a consideration of the extension of calls involving the various offices thereof.

*Section 3.—Initiation of a call in the office A*

Considering now the initiation of a call in the office A, at one of the subscriber substations therein, such, for example, as the subscriber substation T1, the receiver of the telephone instrument at the calling subscriber substation T1 is removed from its associated switchhook, whereby the line circuit 202 is controlled over the subscriber line 201 to mark the subscriber line 201 as busy to the connectors 215, etc., having access thereto and to mark the subscriber line 201 as a calling subscriber line to the finder distributor 205 and to the various finders 210, etc., having access thereto. The finder distributor 205 assigns an idle one of the finders, such as the finder 210, for use at this time, and controls operation thereof to bring about finding of the calling subscriber line 201. When the finder 210 thus finds the calling subscriber line 201, the link 211 effects seizure of the selector 212 and operation of the director finder 213 to select an idle one of the directors 400, etc., having access thereto.

When the director 400 is idle, the guard relay R910 is normally operated over a circuit, including the set of switch springs S1123 and the contacts 1113, 1044 and 1036. The operated guard relay interrupts, at the contacts 913, a path for applying ground potential to the director guard conductor 301; and completes, at the contacts 914, a path, including the resistor 919 for applying battery potential to the director guard conductor 301. The director 400 is marked as idle to the various director finders 213, etc., by the application of battery potential upon the director guard conductor 301; and the director 400 is marked as busy to the various director finders 213, etc., by the application of ground potential upon the director guard conductor 301.

Accordingly, at this time, it is assumed that the director 400 is idle and that it is the first idle director appearing before the director finder 213, whereby the director finder 213 operates to select the particular director 400 over the cable 300. When the director finder 213 thus selects the director 400 for use, ground potential in the link 211 is applied to the director hold conductor 308 completing a circuit, including the contacts 1134, for operating the seizure relay R1040. Upon operating, the seizure relay R1040 completes, at the contacts 1042, a circuit for energizing the winding of the hold relay R1030 in order to cause the latter relay to operate shortly thereafter, it being of the slow-to-operate type. Also, the seizure relay R1040 interrupts, at the contacts 1044, the circuit for maintaining operated the guard relay R910; and completes, at the contacts 1043, a multiple path for applying ground potential to the finder hold conductor 302. Upon restoring, the guard relay R910 interrupts, at the contacts 914, the path for applying battery potential to the director ground conductor 301; and completes, at the contacts 913, the path for applying ground potential to the director guard conductor 301 so as to mark the director 400 as busy to the other director finders, since the director finder 213 has seized the director 400 for the use of the link 211 at this time. Also, the guard relay R910 completes, at the contacts 912, a connection between the 30 second time pulse conductor 900 and the upper winding of the permanent timer relay R1050, for a purpose more fully explained hereinafter.

During the operating time of the hold relay R1030, the lower winding of the tone relay R960 is connected via the contacts 1035 to the switch train release conductor 309 so that the tone relay R960 is partially operated to close its "X" contacts 966 during this time interval by virtue of the connection of battery potential to the switch train release conductor 309 in the selector 212 terminating the outgoing end of the link 211. However, in the case that the subscriber at the calling subscriber substation T1 should commence dialing before the director finder 213 has found the director 400 and completed the connections thereto via the cable 300 ground potential in the selector 212 is returned over the switch train release conductor 309 so as to complete a substantially identical path for shortcircuiting the lower winding of the tone relay R960 so that the tone relay R960 does not operate during the time interval that the hold relay R1030 is operating. In this case, upon operating the hold relay R1030 interrupts, at the contacts 1035, the connection between the lower winding of the tone relay R960 and the switch train release conductor 309 prior to partial operation of the tone relay R960, whereby the busy tone conductor 969 is conected via the contacts 968 to the pulse-in conductor 305 bringing about the return of busy tone over the pulse-in conductor 305.

On the other hand, in the event there is no premature dialing by the subscriber at the calling subscriber substation T1, the tone relay R960 operates partially during the time interval of operation of the hold relay R1030, as previously noted, preparing, at the contacts 966, a circuit for energizing the upper winding thereof. Upon operating, the hold relay R1030 completes, at the contacts 1033, a path for applying ground potential to the hold conductor 1080, whereby the circuit, including the contacts 1012 and 966, is completed for energizing the upper winding of the tone relay R960 so as to effect complete operation thereof. When the tone relay 960 operates completely, it interrupts, at the contacts 968, the connection between the busy tone conductor 969 and the pulse-in conductor 305; and completes, at the contacts 967, a connection between the pulse-in conductor 305 and the upper winding of the line relay R940. Also the tone relay R960 completes, at the contacts 962, a path for applying ground potential to the interrupter start conductor 1447 so as to insure operation of the common interrupter 1400 at this time. Also, the tone relay R960 completes, at the contacts 965, a connection between the winding of the pulse start relay R1020 and the PO(1424) conductor so as to condition the pulse start relay R1020 for operation at the beginning of the next cycle of the interrupter 1400, as explained more fully hereinafter. Further, the tone relay R960 completes, at the contacts 963, a circuit, including the contacts 719 and the set of switch springs S725, for energizing the upper winding of the register sequence relay R410 so as to cause the latter relay to operate through its first step closing its contacts 411, the register sequence relay R410 being of the two-step type. Further, the tone relay R960 completes, at the contacts 964, a path for applying ground potential to the conductor 982, whereby a circuit is completed, also including the contacts 423 and 411, for energizing the lower winding of the register sequence relay R410 causing the latter relay to operate through its second step, thus completely operating the register sequence relay R410. At this time, the director 400 has been seized and is in readiness to receive the digits dialed at the calling subscriber substation T1, assuming, of course, that the tone relay R960 was operated. On the other hand, in the event the tone relay R960 is not operated prior to operation of the hold relay R1030, the director 400 is cut off and is not prepared to receive digits dialed at the calling subscriber substation T1 by virtue of the restored position of the tone relay R960. However, the director 400 is held for the time being until the subscriber at the calling subscriber substation T1 performs a release operation or the director 400 is timed-out, as explained more fully hereinafter.

Assuming that the tone relay R960 is operated, the dial tone conductor 1299 is connected via the associated condenser, the set of switch springs S710, the contacts 715 and through the lower winding of the line relay R940, whereby dial tone current is induced in the upper winding of the line relay R940 and is returned via the contacts 967 and the pulse-in conductor 305 to the calling subscriber substation T1 indicating to the subscriber thereat that at this time he should proceed with the dialing of the first digit of the called office code.

The subscriber at the calling subscriber substation T1 then proceeds to dial the first digit of the called office code, whereby the link 211 repeats corresponding ground impulses over the pulse-in conductor 305, causing the upper winding of the line relay R940 to be energized repeatedly so that the line relay R940 operates and restores in accordance with the impulses of the first digit of the called office code. Each time the line relay R940 operates and then restores, it completes and then interrupts, at the contacts 943, a path for applying ground potential to the conductor 981, whereby the winding of the dial relay R950 is energized repeatedly causing the latter relay to operate and remain operated during impulsing, since the latter relay is of the slow-to-release type. The operated register sequence relay R410 completed, at the contacts 412, a connection between the conductor 981 and the vertical magnet M700 so that as the line relay R940 is operated and then restored, the ground pulses are repeated, at the contacts 943 thereof, to the vertical magnet M700 so that the wiper carriage of the Strowger mechanism incorporated in the route and zone switch 800 is driven step by step in the vertical direction away from its normal vertical position in accordance with the impulses of the first office code digit. The subsequent operation of the director 400 depends upon whether the first office code digit identifies a called office inside the local area (in which the office A is located) or a called office outside the local area (the distant area or the remote area), as explained more fully subsequently.

*Section 4.—Calls inside the local area*

Now assuming that the first office code digit received by the director 400 identifies a called office inside the local area, such, for example, as the offices B, C or E, or the main office D, the first office code digit is 5 in the present example. When the wiper carriage of the Strowger mechanism of the route and zone switch 800 is operated out of its normal vertical position, the sets of switch springs S710, S725, S1123, and S1038 are operated, and when this wiper carriage is driven into the fifth level, the set of switch springs S705 is operated. Upon operating, the set of switch springs S710 interrupts the path for returning dial tone current to the lower winding of the line relay R940 so as to arrest the return of dial tone over the connection to the calling subscriber substation T1. When the set of switch springs S725 is operated, a further point in a circuit traced hereinafter for energizing the lower winding of the local area relay R730 is interrupted. When the set of switch springs S1123 is operated, a further point in the circuit for operating the guard relay R910 is opened; and when the set of switch springs S1038 is operated, a point in a circuit traced hereinafter for energizing the lower winding of the local area relay R710 is prepared. When the set of switch springs S705 is operated, the contacts 708 thereof are opened, and the contacts 709 thereof are closed, preparing a further point in the circuit for energizing the lower winding of the local area relay R710. At the conclusion of the first office code digit 5, the line relay R940 remains restored so that the dial relay R950 restores shortly thereafter, to complete, at the contacs 951, the previously mentioned circuit for energizing the lower winding of the local area relay R710. This circuit includes the set of switch springs S1038, the contacts 951 and 737, the contacts 709 of the set of switch springs S705 and the lower winding of the local area relay R710. When the lower winding of the local area relay R710 is thus energized, the latter relay operates to complete, at the contacts 718, a holding circuit, including the contacts 1033 and the grounded hold conductor 1080, for energizing the upper winding thereof. Also, the local area relay R710 completes, at the contacts 712′, a circuit, including the contacts 737 and 951 and the set of switch springs S1038 for operating the release magnet M703. Further, the local relay R710 interrupts, at the contacts 715, a further point in the path for connecting the dial tone conductor 1299 to the lower winding of the tone relay R960.

Upon operating, the release magnet M703 releases the wiper carriage of the route and zone switch 800 causing it to be returned back into its normal vertical position so that the sets of switch springs S710, S725, S1038 and S1123 are again operated back into their normal positions. More particularly, when the set of switch springs S725 is closed, a series circuit is completed for energizing the lower winding of the local area relay R730 and the upper winding of the register sequence relay R410, this circuit also including the contacts 963, whereby the local area relay R730 is operated and the register sequence relay R410 is retained in its operated position. Upon operating, the local area relay R730 completes, at the contacts 735, a holding circuit, including the grounded hold conductor 1080, for energizing the upper winding thereof. When the set of switch springs S1038 is operated, the circuit for operating the release magnet M703 is interrupted in order to cause the release magnet M703 to restore. Also, the local area relay R730 interrupts, at the contacts 737, a further point in the circuit for operating the release magnet M703; and prepares, at the contacts 736, a circuit traced hereinafter, for energizing the upper winding of the register sequence relay R420.

At this time, the subscriber at the calling subscriber substation T1 dials the second digit of the called office code in the local area, whereby the line relay R940 again follows, repeating the impulses of this digit, at the contacts 943, so that the dial relay R950 is reoperated and remains operated during impulsing, and the vertical magnet M700 is again reoperated driving the wiper carriage of the route and zone switch 800 in the vertical direction a number of steps corresponding to the impulses of the second digit of the called office code. At the conclusion of the second office code digit, the line relay R940 is retained in its restored position causing the dial relay R950 to restore shortly thereafter. Of course, when the wiper carriage of the route and zone switch 800 are again operated in the vertical direction away from its normal vertical position, the sets of switch springs S710, S725, S1038 and S1123 are reoperated. Upon restoring the dial relay R950 completes, at the contacts 951, the previously mentioned circuit, including the set of switch springs S1038 and the contacts 736 and 413, for energizing the upper winding of the register sequence relay R420, whereby the latter relay operates first to close its contacts 422 so as to complete a holding circuit, including the contacts 434 and the grounded conductor 982, for energizing the lower winding thereof. The register sequence relay R420 then operates fully interrupting, at the contacts 423, the holding circuit for energizing the lower winding of the register sequence relay R410. At this time, the previously traced circuit for energizing the upper winding of the register sequence relay R410 in series with the lower winding of the local area relay R730 is interrupted at the set of operated switch springs S725. Accordingly, at this time, the register sequence relay R410 restores, interrupting, at the contacts 412, a further point in the circuit for operating the vertical magnet M700. Moreover, the operated register sequence relay R420 completes, at the contacts 425, a connection between the conductor 981 and the rotary magnet M701, thereby preparing the rotary magnet M701 for operation. Also the operated register sequence relay R420 prepared, at the contacts 421, a circuit traced hereinafter for energizing the upper winding of the register sequence relay R430; and prepares, at the contacts 427, a circuit traced hereinafter for energizing the winding of the reroute relay R1230 which circuit includes the vertical control wiper 809 of the route and zone switch 800, the engaged contact in the associated control contact bank V and a strap, if provided, to the G terminal that is, in turn, connected to the G(1448) conductor in the cable 1401, extending to the interrupter 1400; which arrangement is employed, for a purpose more fully explained hereinafter. Also, the register sequence relay R420 completes, at the contacts 424, a circuit, including the contacts 527, the conductor 1261, the contacts 1211, and the grounded conductor 982, for energizing the upper winding of the send sequence relay R510, in order to cause the latter relay to operate through its first step, completing, at the contacts 514, a path, including the contacts 424, for shortcircuiting the lower winding thereof, whereby the send sequence relay R510 is not operated through its second step at this time.

At this time, the subscriber at the calling subscriber substation T1 dials the third digit of the called office code in the local area, whereby the line relay R940 again follows, repeating the impulses of this digit, at the contacts 943, so that the dial relay R950 is reoperated and remains operated during impulsing and the rotary magnet M701 is operated driving the wiper carriage of the route and zone switch 800 in the rotary direction a number of steps corresponding to the impulses of the third digit of the called office code; this circuit including the conductor 981 and the contacts 425. Also upon operating, the dial relay R950 completes, at the contacts 952, a circuit, including the set of switch springs S1038 and the contacts 421 and 432, for energizing the upper winding of the register sequence relay R430 so as to cause the latter relay to operate through its first step, closing the contacts 433 in order to complete a path, including the contacts 444 and the grounded conductor 982, for short circuiting the lower winding thereof. At the conclusion of the third office code digit, the line relay R940 is retained in its restored position causing the dial relay R950 to restore shortly thereafter, interrupting, at the contacts 952, the path for short circuiting the lower winding of the register sequence relay R430 so that the latter relay operates through its second step or fully. When the register sequence relay R430 operates fully, it interrupts, at the contacts 434, the holding circuit for energizing the lower winding of the register sequence relay R420 so as to cause the latter relay to restore. Also, the register sequence relay R430 prepares, at the contacts 431, a circuit traced hereinafter for energizing the upper winding of the register sequence relay R440; and prepares, at the contacts 435, a circuit, traced hereinafter, extending to the first digit register 1301. Upon restoring, the register sequence relay R420 interrupts, at the contacts 424, the path for short circuiting the lower winding of the send sequence relay R510 so that the latter relay is operated through its second step via a circuit, including the contacts 527 and 514, the conductor 1261, the contacts 1211 and the grounded conductor 982, as well as the upper and lower windings thereof. Before proceeding with the sending operation of the director 400 or the reception of the first numerical digit the operation of the route and zone switch 800 is reviewed.

Recapitulating, when the first office code digit 5 was registered in the vertical magnet M700 of the route and zone switch 800, the release magnet M703 was operated to release the wiper carriage of the route and zone switch 800 on a drop-back basis since the first office code digit 5 was indicative of a called office inside the local area. The second office code digit was then registered in the vertical magnet M700; and the third office code digit was then registered in the rotary magnet M701. Accordingly, at the conclusion of the dialing of the third office code digit, the wipers 801, etc., of the route and zone switch 800 occupy a vertical position corresponding to the second office code digit and a rotary position corresponding to the third office code digit, the first office code digit 5 having been absorbed by the drop-back arrangement, as previously described.

*Section 5.—Calls outside the local area*

Now assuming that the first office code digit received by the director 400 identifies a called office outside the local area, such, for example, as the offices F or G, the first office code digit is other than 5, whereby the set of switch springs S705 is not operated at the conclusion of the operation of the vertical magnet M700, so that the local area relay R710 is not operated. In this case, at the conclusion of the first office code digit, the line relay R940 is retained in its restored position so as to effect the restoration of the dial relay R950 shortly thereafter, whereby a circuit, including the set of switch springs S1038, the contacts 951, the contacts 708 of the set of switch springs S705, the contacts 711' and 413, is completed for energizing the upper winding of the register sequence relay R420 causing the latter relay to operate and complete, at the contacts 422, the holding circuit for energizing the lower winding thereof. The register sequence relay R420 effects the restoration of the register sequence relay R410, in the manner previously explained, whereby the vertical magnet M700 is disconnected from the conductor 981, at the contacts 412, of the restored register sequence relay R410; and the rotary magnet M701 is connected, at the contacts 425, of the operated register sequence relay R420 to the conductor 981. Thus it will be understood that the second office code digit dialed at the calling subscriber substation T1 will be received by the line relay R940 and repeated, at the contacts 943, both to the dial relay R950 and to the rotary magnet M701. At the conclusion of the second office code digit, the line relay R940 is retained in its restored position effecting the restoration of the dial relay R950 shortly thereafter, whereby the register sequence relay R430 is operated and the register sequence relay R420 is restored effecting operation of the send sequence relay R510 through its second step or completely. Before proceeding with the sending operation of the director 400 or the reception of the first numerical digit, the operation of the route and zone switch 800 is reviewed.

Recapitulating, the first office code digit was registered in the vertical magnet M700 and the second office code digit was then registered in the rotary magnet M701. Accordingly, at the conclusion of the dialing of the second office code digit, the wipers 801, etc., of the route and zone switch 800 occupy a vertical position corresponding to the first office code digit and a rotary position corresponding to the second office code digit.

*Section 6.—Registration of numerical digits in the director*

As previously explained in Sections 4 and 5, after the subscriber at the calling subscriber substation T1 dials the three digits of the called office code inside the local area, or the two digits of the called office code outside the local area, he proceeds to dial the several numerical digits, the number being dependent upon the size of the called office and facility for registering five numerical digits being provided in the director 400. At this time, the register sequence relay R430 occupies its operated position completing, at the contacts 435, a connection between the common conductor 946 and the first operate conductor 1361 extending to the first digit register 1301. The line relay R940 receives the first numerical digit, repeating, at the contacts 943, so as to effect operation of the dial relay R950. Upon operating, the dial relay R950 completes, at the contacts 952, a circuit, including the set of switch springs S1038 and the contacts 431, 481 and 442, for energizing the upper winding of the register sequence relay R440, whereby the latter relay operates partially to complete, at the contacts 443, a path substantially identical to that previously traced for short circuiting the lower winding thereof, so as to prevent complete operation thereof at this time. Normally, the condenser 944 is short circuited through the contact 941 of the restored line relay R940 and the resistor 945; however, upon the first operation of the line relay R940, it completes, at the contacts 942, a connection between the condenser 944 and the common conductor 946, whereby the right-hand winding of the first digit relay R1310 in the first digit register 1301 is energized via a circuit including the first operate conductor 1361 and the contacts 1313, 1324, 1334 and 1344. Accordingly, at this time, the right-hand winding of the first digit relay R1310 is energized, while the condenser 944 is charged in series therewith. The first digit relay R1310 operates to complete, at the contacts 1318, a holding circuit for energizing the left-hand winding thereof; which holding circuit also includes the contacts 1321 and the grounded first hold conductor 1371. At this time, ground potential appears upon the first hold conductors 1371, via a path, including the contacts 961, 1255, 643 and 484. Also, upon operating, the first digit relay R1310 interrupts, at the contacts 1313, the circuit for energizing the right-hand winding thereof and for charging the condenser 944 in series relation; and completes, at the contacts 1312, a substantially identical circuit for connecting the right-hand winding of the second digit relay R1320 between the first operate conductor 1361 and ground potential at the contacts 1344. However, at this time, the condenser 944 has been completely charged so that the right-hand winding of the second digit relay R1320 is not effectively energized so that the latter relay does not operate at this time.

Now when the line relay R940 restores at the conclusion of the first impulse, it interrupts, at the contacts 942, the connection between the condenser 944 and the common conductor 946; and completes, at the contacts 941, the normal path, including the resistor 945 for short-circuiting the condenser 944 in order to effect the discharge thereof. Upon the next operation of the line relay R940, the discharged condenser 944 is again connected, at the contacts 942, to the common conductor 946 so that the condenser 944 is again charged in series with the right-hand winding of the second digit relay R1320 in the first digit register 1301 causing the latter relay to operate and to complete, at the contacts 1322, a holding circuit for energizing the left-hand winding thereof that includes the contacts 1331 and the grounded first hold conductor 1371. Also upon operating, the second digit relay R1320 interrupts, at the contacts 1321, the holding circuit for energizing the left-hand winding of the first digit relay R1310 in order to cause the latter relay to restore. Further, upon operating, the second digit relay R1320 interrupts, at the contacts 1324, the circuit for energizing the right-hand winding thereof, and completes, at the contacts 1323, a connection between the first operate conductor 1361 and ground potential, at the contacts 1344, via the right-hand winding of the third digit relay R1330. However, the third digit relay R1330 is not operated since the condenser 944 is completely charged at this time.

In view of the above description, it will be understood that as the series of impulses comprising the first numerical digit is received by the line relay R940, that the line relay operates and restores intermittently alternately discharging the condenser 944 through the resistor 945 and charging the condenser 944 via the common conductor 946. The first time, the condenser 944 is charged over the common conductor 946 in series with the right-hand winding of the first digit relay R1310; the second time, the condenser 944 is charged over the common conductor 946 in series with the right-hand winding of the second digit relay R1320; the third time, the condenser 944 is charged over the common conductor 946 in series with the right-hand winding of the third digit relay R1330; etc.

Considering now in greater detail the connection and arrangement of the various digit relays R1310, R1320, etc., in the first digit register 1300, it will be appreciated that the first digit relay R1310 operates on the first impulse; the second digit relay R1320 operates on the second impulse restoring the first digit relay R1310; the third digit relay R1330 operates on the third impulse restoring the second digit relay R1320; the fourth digit relay R1340 operates on the fourth impulse restoring the third digit relay R1330; and the fifth digit relay R1350 operates on the fifth impulse restoring the fourth digit relay R1340.

Now, however, upon operating the fifth digit relay R1350 completes, at the contacts 1353, a holding circuit for energizing the left-hand winding thereof via the grounded first hold conductor 1371, which holding circuit is independent of the other digit relays R1310, etc. Accordingly, on the sixth impulse, the first digit relay R1310 is reoperated via the first operate conductor 1361 over a circuit including the right-hand winding thereof and the contacts 1313, 1324, 1334 and 1344, whereby the first digit relay R1310 completes, at the contacts 1318, a direct holding circuit, including the contacts 1352 and the first hold conductor 1371 that is independent of the digit relays R1320, etc. Accordingly, at the conclusion of the sixth impulse, both of the digit relays R1350 and R1310 are operated. Now in the seventh impulse, the second digit relay R1320 is operated, whereby at the conclusion thereof, the digit relays R1350, R1310 and R1320 occupy their operated positions. In the eighth impulse, the third digit relay R1330 is operated, interrupting, at the contacts 1331, the holding circuit for retaining operated the second digit relay R1320, whereby at the conclusion of the eighth impulse, the digit relays R1350, R1310 and R1330 are operated. In the ninth impulse, the fourth digit relay R1340 is operated interrupting, at the contacts 1341, the holding circuit for retaining operated the third digit relay R1330, whereby at the conclusion of the ninth impulse, the digit relays R1350, R1310 and R1340 are operated. Finally, in the tenth impulse, the second digit relay R1320 is operated via a circuit, including the contacts 1312, 1324, 1354 and 1343, whereby, at the conclusion of the tenth impulse, the digit relays R1350, R1310, R1340 and R1320 are operated.

Consider now the marking paths that may be completed between the first marking conductors 1381 and the ten individual marking conductors in the cable 826, it will be observed that the ten contact schedules are as follows:

| From Marking Conductor 1381 to Marking Conductor Indicated in Cable 826 | Contacts Involved |
|---|---|
| 1 | 1357, 1314 |
| 2 | 1357, 1315, 1325 |
| 3 | 1357, 1315, 1326, 1335 |
| 4 | 1357, 1315, 1326, 1336, 1345 |
| 5 | 1356, 1317 |
| 6 | 1356, 1316, 1328, 1338, 1349 |
| 7 | 1356, 1316, 1327, 1347 |
| 8 | 1356, 1316, 1328, 1337 |
| 9 | 1356, 1316, 1328, 1338, 1348 |
| 10 | 1356, 1316, 1327, 1346 |

At this time, ground potential is applied to the second hold conductor 1372 extending to the second digit register 1302 via a path, including the contacts 653, 1255 and 961; ground potential is applied to the third hold conductor 1373 extending to the third digit register 1303 via a path, including the contacts 662 and 961; ground potential is applied to the fourth hold conductor 1374 extending to the fourth digit register 1304 via a path, including the contacts 672 and 961; and ground potential is applied to the fifth hold conductor 1375 extending to the fifth digit register 1305 via a path, including the contacts 634 and 961. Thus the second digit register 1302, the third digit register 1303, the fourth digit register 1304 and the fifth digit register 1305 are similarly prepared to register the corresponding second, third, fourth and fifth numerical digits.

At the conclusion of the first numerical digit, the line relay R940 is retained in its restored position effecting the restoration of the dial relay R950 shortly thereafter, whereby there is interrupted, at the contacts 952, the previously traced path for short circuiting the lower winding of the register sequence relay R440 in order to cause the latter relay to operate through its second step or completely; whereby the register sequence relay R440 interrupts, at the contacts 444, the holding circuit for retaining operated the register sequence R430. The restored register sequence relay R430 disconnects, at the contacts 435, the common conductor 946 from the first operate conductor 1361 extending to the first digit register 1301, and the operated register sequence relay R440 connects, at the contacts 445, the common conductor 946 to the second operate conductor 1362 extending to the second digit register 1302. Thus it will be understood that during the second numerical digit, the register sequence relay R440 is operated; and at the conclusion thereof, the register sequence relay R450 is operated effecting the restoration of the register sequence relay R440. Accordingly, it will be appreciated that the register sequence relays R430, R440, R450, R460 and R470 are operated in sequence by the dial relay R950 so as to bring about the registration of the first, second, third, fourth and fifth numerical digits in the respective numerical digit registers 1301, 1302, 1303, 1304 and 1305.

*Section 7.—Unassigned office codes*

Considering now the matter of the possible registration of unassigned office codes in the route and zone switch 800, as explained in Sections 4 and 5, it is noted that in each cycle of operation of the interrupter 1400, ground potential is applied for a short time interval to the PO(1424) conductor and that within the PO pulse ground potential is applied for a short time interval to the PV(1425) conductor and consequently to the GPV terminal. The application of ground potential to the PO(1424) conductor effects operation of the pulse start relay R1020 via a circuit, including the contacts 965. Shortly following the registration of the third office code digit designating a called office inside the local area or the registration of the second office code digit designating a called office outside the local area, the register sequence relay R420 restores incident to the operation of the register sequence relay R430, whereby there is normally interrupted, at the contacts 424, the previously traced path for short circuiting the lower winding of the send sequence relay R510. However, at this time, should the pulse start relay R1020 occupy its operated position, an alternative path, including the contacts 1021 and 513, is completed for short circuiting the lower winding of the send sequence relay R510. Accordingly, following the restoration of the register sequence relay R420 and at a time when the pulse start relay R1020 occupies its restored position, the paths for short circuiting the lower winding of the send sequence relay R510 are interrupted causing the latter relay to operate fully via the circuit including the upper and lower windings thereof as well as the contacts 527 and 514 and the grounded conductor 1261. Upon operating completely, the send sequence relay R510 interrupts, at the contacts 513, a further point in the path for short circuiting the lower winding thereof, and prepares, at the contacts 512, a circuit traced hereinafter for energizing the upper winding of the send sequence relay R520. Also, the send sequence relay R510 prepares, at the contacts 511 and 516, a test circuit traced hereinafter for energizing the lower winding of the unassigned code relay R1010. Now upon the next operation of the pulse start relay R1020 when ground potential is applied to the PO(1424) conductor at the beginning of the next cycle of operation of the interrupter 1400, there is completed, at the contacts 1026, the test circuit, including the lower winding of the unassigned code relay R1010 for the purpose of determining whether an unassigned code has been registered upon the route and zone switch 800. More particularly, battery potential is applied via the resistor 580, the contacts 516, 1026, 1148, 1218, 522 and 511 to one terminal of the lower winding of the unassigned code relay R1010; and the other terminal of the lower winding of the unassigned code relay R1010 is connected via the conductor 578 to either the contacts 716 or the contacts 717 of the local area relay R710 to the respective wipers 801 or 802 carried by the wiper carriage of the route and zone switch 800. Now in the event a called office code inside the local area has been registered in the route and zone switch 800, the local area relay R710 occupies its operated position, whereby the test circuit extends to the wiper 802; and in the event a called office code outside the local area has been registered in the route and zone switch 800, the local area relay R710 occupies its restored position, whereby the test circuit extends to the wiper 801. The wipers 801 and 802 engage contact sets in the associated contact banks A and B that are respectively strapped to the 2Z pins that are, in turn, strapped via the conductor 811 to the GPV terminal in the event these selected contact sets respectively correspond to unassigned codes, whereby the ground potential upon the GPV terminal derived from the PV conductor energizes the lower winding of the unassigned code relay R1010 causing operation thereof. From an examination of the chart of Fig. 14A, it will be observed that the PV pulse arrives inside of the PO pulse from the interrupter 1400. Upon operating, the unassigned code relay R1010 completes, at the contacts 1011, a holding circuit, including the contacts 1032 and the set of switch springs S1038, for energizing the upper winding thereof; and interrupts, at the contacts 1012, the holding circuit for energizing the upper winding of the tone relay R960, causing the latter relay to restore. Upon restorng the tone relay R960 completes, at the contacts 968, the previously traced connection, including the busy tone conductor 969, for returning busy tone over the pulse-in conductor 305 so as to bring about the return of busy tone to the subscriber at the calling subscriber substation T1.

Recapitulating, it will be understood that in the event the subscriber at the calling subscriber substation T1 registers upon the route and zone switch 800, an unassigned code, that busy tone is returned thereto, whereby the subscriber should release the connection effecting the release of the director 400 or the director will be released by timing-out, as explained more fully hereinafter.

*Section 8.—Zone metering control*

In the first cycle of operation of the interrupter 1400, the pulse start relay R1020 operates and restores, as explained in Section 7, bringing about complete operation of the send sequence relay R510, whereby the operated send sequence relay R510 prepares, at the contacts 512, a circuit for energizing the upper winding of the send sequence relay R520. Upon the next cycle of operation of the interrupter 1400, the pulse start relay R1020 again operates and restores as a consequence of the application of ground potential upon the PO(1424) conductor. Upon operating, the pulse start relay R1020 completes, at the contacts 1021, the circuit, including the contacts 512 and 525, as well as the grounded conductor 1261, for energizing the upper winding of the send sequence relay R520 causing the latter relay to operate through its first step to complete, at the contacts 526, a substantially identical path, including the contacts 537 and the grounded conductor 1261, for short-circuiting the lower winding thereof. Subsequently when the pulse start relay R1020 restores, it interrupts, at the contacts 1021, the above-mentioned path for short-circuiting the lower winding of the send sequence relay R520, whereby the latter relay operates through its second step or completely, interrupting, at the contacts 527, the holding circuit for retaining operated the send sequence relay R510. Also, the send sequence relay R520 prepares, at the contacts 524, a circuit traced hereinafter for energizing the upper winding of the send sequence relay R530; and prepares, at the contacts 528, a path for transmitting ground impulses over the zone pulse conductor 303 extending back through the link 211 to the stepping magnet M332 of the switch 330 incorporated in the zone metering apparatus 350. Further, the send sequence relay R520 prepares, at the contacts 523, a circuit traced hereinafter for operating the pickup relay R1140. Subsequently in this second cycle of operation of the interrupter 1400 ground potential is applied to the PU(1441) conductor as it is removed from the PO(1424) conductor as indicated in the chart of Fig. 14A. The application of ground potential to the PU(1441) conductor completes a circuit, including the contacts 1212, 1131, 971 and 523, for operating the pickup relay R1140. Upon operating, the pickup relay R1140 completes, at the contacts 1142, a direct holding circuit, including the contacts 1212, for energizing the winding thereof; completes, at the contacts 1143, a path, including the contacts 1165 and the resistor 1180, for applying battery potential to the pulse guard conductor 304; and completes, at the contacts 1146, a circuit, including the contacts 1042 and 1167, for energizing the lower winding of the lockout relay R1110 so as to cause the latter relay to operate. Also upon operating, the pickup relay R1140 completes, at the contacts 1141, the connection, including the contacts 528 and 1162, between the 10IPS conductor 1416 and the zone pulse conductor 303. Further, the pickup relay R1140 prepares, at the contacts 1147, a circuit traced hereinafter for energizing the upper winding of the pulse stop relay R1160.

As the second cycle of the interrupter 1400 proceeds, ground impulses are alternately applied to the 10IPS conductor 1416 and to the conductor SZ1, SZ2, etc., sequentially. The ground impulses applied to the 10IPS conductor 1416 are forwarded over the zone pulse conductor 303 effecting operation and restoration of the stepping magnet M332 of the switch 330 in the zone metering apparatus 350, whereby the wiper 331 thereof is stepped from its normal rotary position a number of steps in the counterclockwise direction corresponding to the number of impulses transmitted over the zone pulse conductor 303. More particularly, the wiper 331 of the switch 330 is operated to register a number of unit zone charges corresponding to the extent of the present call in accordance with the called office code that has been dialed by the subscriber at the calling subscriber substation T1 and registered in the route and zone switch 800 in the director 400. When the wiper 331 of the switch 330 is driven out of its normal home position the sets of switch springs S334 and S335 are operated for a purpose more fully explained hereinafter.

At this time, either the wiper 801 or the wiper 802 of the route and zone switch 800 is connected to the conductor 578 depending upon the position of the local area relay R710, thereby preparing the circuit, also including the contacts 532, 521, 1218 and 1147, for energizing the upper winding of the pulse stop relay R1160. At this time, the wiper 801 has selected a contact in the associated contact bank A appropriate to a two-digit called office code outside of the local area and strapped to the pins 2Z, while the wiper 802 has selected a contact in the associated contact bank B appropriate to a three-digit called office code inside of the local area and strapped to the pins 2Z. The pins 2Z are strapped via the conductors 820 and 821 to the X1, X2, etc. terminals, and thence to the conductors SZ1 and SZ2, etc., in accordance with the number of unit zone impulses required.

Accordingly, after the transmission of the required number of zone impulses over the 10IPS conductor (1416), ground potential is applied to the SZ1, SZ2, etc., conductor that is connected to the selected one of the contact sets engaged by the selected one of the wipers 801 or 802 so that a circuit is completed for energizing the upper winding of the pulse stop relay R1160 causing the latter relay to operate and interrupt, at the contacts 1162, the connection between the 10IPS conductor 1416 and the zone pulse conductor 303 so as to terminate the sending of further impulses over the zone pulse conductor 303, whereby further operation of the stepping magnet M332 of the switch 330 in the zone metering apparatus 350 is arrested, at this time. Also, the pulse stop relay R1160 completes, at the contacts 1163, a holding circuit, including the contacts 1224 and 1033, for energizing the lower winding thereof; and interrupts, at the contacts 1167, the circuit for energizing the lower winding of the lockout relay R1110 so as to cause the latter relay to restore; and interrupts, at the contacts 1165, the previously traced path for connecting battery potential via the resistor 1180 to the pulse guard conductor 304. Also, the pulse stop relay R1160 completes, at the contacts 1164, a connection between the PM(1168) conductor in the cable 827 and the upper winding of the interdigit relay R1220 for a purpose more fully explained hereinafter. Further, the pulse stop relay R1160 prepares, at the contacts 1161, a circuit traced hereinafter, for energizing the upper winding of the send sequence relay R530. During the present cycle of the interrupter 1400 or in the next cycle thereof, depending upon the number of impulses that are transmitted over the zone pulse conductor 303, ground potential is ultimately applied to the SZ6 conductor to which the PM(1168) conductor is strapped, thereby completing the previously mentioned circuit for energizing the upper winding of the interdigit relay R1220 causing the latter relay to operate and complete, at the contacts 1225, a holding circuit, including the contacts 1166, 1146 and 1042, for energizing the lower winding thereof. Also, the interdigit relay R1220 prepares, at the contacts 1223, a circuit for the subsequent cycle of operation of the pickup relay R1140; and completes, at the contacts 1222, the circuit, including the contacts 1161, 524 and 535, for energizing the upper winding of the send sequence relay R530 so as to cause the latter relay to operate through its first step, completing at the contacts 536, a substantially identical path, including the grounded conductor 1261, for short-circuiting the lower winding thereof. At the conclusion of the present cycle of operation of the interrupter 1400 ground potential is removed from the PU(1441) conductor bringing about the restoration of the pickup relay R1140, whereby the latter relay transfers, at the contacts 1146 and 1145, the holding circuit for energizing the lower winding of the interdigit relay R1220 retaining the latter relay in its operated position at this time. At the beginning of the next cycle of operation of the interrupter 1400, ground potential is returned upon the PO(1424) conductor reoperating the pulse start relay R1020. Upon reoperating the pulse start relay R1020 interrupts, at the contacts 1025, the holding circuit for energizing the lower winding of the pulse stop relay R1160, since the interdigit relay R1220 occupies its operated position opening the multiple contacts 1224. Upon restoring, the pulse stop relay R1160 interrupts, at the contacts 1161, the previously traced path for short-circuiting the lower winding of the register sequence relay R530 so as to cause the latter relay to operate through its second step or completely. Upon operating completely, the send sequence relay R530 interrupts, at the contacts 537, the holding circuit for retaining operated the send sequence relay R520; prepares, at the contacts 534, a circuit traced hereinafter for energizing the upper winding of the send sequence relay R540; and prepares, at the contacts 533, an alternative circuit, traced hereinafter, for energizing the winding of the pickup relay R1140. Further, the send sequence relay R530 prepares, at the contacts 531, an alternative circuit traced hereinafter, for energizing the upper winding of the pulse stop relay R1160. In the present cycle of the interrupter 1400 when ground potential is applied to the PU(1441) conductor, the circuit, including the contacts 1212, 1131, 971, 1223, 1023 and 533, is completed for operating the pickup relay R1140. Upon operating the pickup relay R1140 completes, at the contacts 1142, a direct holding circuit for energizing the winding thereof; and interrupts, at the contacts 1145, the holding circuit for retaining operated the inter-digit relay R1220. At this time, the director 400 proceeds with the discriminations based upon the particular code digits registered in the route and zone switch 800, in a manner more fully explained subsequently.

In conjunction with the zone metering control, it is noted that in the event the selected wiper 801 or 802 engages a contact in the associated contact banks A or B, identifying a called office for which there is to be no charge for the call from the calling subscriber substation T1, the pin 2Z to which the contact set is strapped is further strapped by the conductor 812 to the GPU terminal so that in the cycle of operation of the interrupter 1400 preceding the transmission of any impulses over the 10IPS conductor 1416, the skip relay R970 and the send sequence relay R530 are operated. More particularly, ground potential upon the GPU terminal is applied via the selected wiper 801 or 802 and the contacts 716 or 717 to the conductor 578 so as to complete a circuit, also including the contacts 532, 521, 1218, 1148, 1026, 524 and 535, for energizing the winding of the skip relay R970 in series with the upper winding of the send sequence relay R530, as soon as the pulse start relay R1020 is operated. Upon operating, the skip relay R970 interrupts, at the contacts 971, a point in the circuit for operating the pickup relay R1140; and upon operating, the send sequence relay R530 effects the restoration of the send sequence relay R520. Accordingly, no ground impulses are transmitted from the director 400 over the zone pulse conductor 303 to the zone metering apparatus 350 in the event metering is not required, as described above.

In passing, it is noted that the send sequence relay R530 operates completely, as described immediately above, by virtue of the voltage drop through the winding of the skip relay R970 that is applied to the junction between the upper and lower windings thereof, so that when the send sequence relay R530 operates to close its contacts 536, the lower winding thereof is not short-circuited by the presence of ground potential upon the conductor 982. Thus as noted, the send sequence relay R530 operates fully in series with the skip relay R970 over the automatic circuit above described.

Recapitulating, in the above-described operation of the director 400, it is determined whether a zone charge is to be made for the present call initiated at the calling subscriber substation T1 and registered in the director 400; and it is also determined that in the event a special zone charge is to be made the character thereof and the required operation of the zone metering apparatus 350 is accomplished. Specifically, in the event the special zone charge is to be made, the required number of impulses are registered in the switch 330 in the zone metering apparatus 350, in the manner described.

Now subsequently the connection is extended from the link 211 via the selector 212 on to the called subscriber substation in the called office, as explained more fully hereinafter; and in the event the call is answered, the link 211 is conditioned so that at the conclusion of the established connection and incident to the release thereof, ground potential in the link 211 is applied to the start conductor 312 effecting operation of the meter relay R320 in the zone metering apparatus 350. Upon operating, the meter relay R320 completes, at the contacts 322, a holding circuit, including the grounded hold conductor 313 for energizing the winding thereof. Also, the meter relay R320 completes, at the contacts 321, a circuit, including the set of switch springs S334 and the contact 343, for operating the step magnet M342, whereby the wiper 341 of the switch 340 is driven step by step in the clockwise direction by virtue of the inclusion of the interrupter contacts 343 in the operating circuit of the stepping magnet M342. More particularly, each time the stepping magnet M342 operates, it interrupts, at the contacts 343, the operating circuit thereof, as well as a multiple circuit extending via the conductor 311 and the finder 210 to the meter 216 provided in the line circuit 202 individual to the subscriber line 211 extending to the calling subscriber substation T1. Accordingly, the meter 216 and the stepping magnet M342 are operated one or more times in parallel circuit relationship until the wiper 341 of the switch 340 engages the contact in the associated contact bank that is strapped to the contact that is engaged by the wiper 331 of the switch 330, whereby a circuit is completed for operating the release magnet M333, and a multiple circuit, including the sets of switch springs S335 and S345, is completed for operating the release magnet M344. Accordingly, the switches 330 and 340 are released and the wipers 331 and 341 thereof are returned back into their normal or home positions. When the switches 330 and 340 are released, the sets of switch springs S334, S335 and S345 are operated. Specifically, the set of switch springs S334 is opened to interrupt the circuit for operating the stepping magnet M342 and the meter 216. Subsequently when the link 211 is further released, ground potential is removed from the hold conductor 313 effecting the restoration of the meter relay R320 and the consequent complete release of the zone metering apparatus 350.

In passing, it is noted that in the event the present call is never answered at the called subscriber substation in the called office, the link 211 incident to the release of the connection does not apply ground potential to the start conductor 312 so that the meter relay R320 is not operated. Also, in this event and incident to the complete release of the link 211, ground potential is applied to the release conductor 314 in order to complete an alternative circuit, including the set of switch springs S335, for operating the release magnet M333 of the switch 330.

In view of the above, it will be understood that at the conclusion of the connection, in the event the call was ultimately answered at the called subscriber substation in the called office, and incident to the release of the link 211, the zone metering apparatus 350 is controlled to operate the meter 216 in the line circuit 202 a number of times corresponding to the setting of the switch 330 that was accomplished under the control of the director 400 incident to the setting-up of the connection from the calling subscriber substation T1.

*Section 9.—General routing plan*

Before proceeding with the operation of the director 400 to control the operation of the selector 212 and the succeeding elements of the switch train, it is pointed out that the present call may be routed to a called office inside the local area that does not require extension through the main office D, such, for example, as the offices B and C; or the present call may be routed to a called office inside the local area that requires extension through the main office D, such, for example, as the offices D and E; or the present call may be routed to a called office outside the local area that does not require extension through the main office D, such, for example, as the office F; or the present call may be routed to a called office outside the local area that requires extension through the main office D, such, for example, as the office G. In the routing of a call inside the local area that is not extended through the main office, one or two or three routing digits may be required; in the routing of a call outside the local area that is not extended through the main office only one routing digit is required; in the routing of a call inside the local area that is extended through the main office three predetermined routing digits are required in additon to the three office code digits as registered; and in the routing of a call outside the local area that is extended through the main office the three predetermined routing digits are required in addition to the two office code digits as registered.

*Section 10.—Routing a call inside the local area independently of the main office*

Considering now the routing of a call inside the local area independently of the main office, in the present cycle of the interrupter 1400 the pulse start relay R1020 operates effecting restoration of the pulse stop relay R1160 and the consequent complete operation of the send sequence relay R530, in the manner previously explained. Now during the transmission of the ground impulse over the PO(1424) conductor, the ground impulse is transmitted over the PV(1425) conductor, as indicated in the chart of Fig. 14A; whereby a circuit, including the contacts 1022, is completed for energizing the upper winding of the cycle relay R720 in order to cause the latter relay to operate. Upon operating, the cycle relay R720 completes, at the contacts 722, a path for short-circuiting the lower winding thereof in order to render the latter relay slightly slow-to-release at the termination of the transmission of the ground impulse over the PV(1425) conductor. Also the cycle relay R720 interrupts, at the contacts 721, the normal path for short-circuiting the lower winding of the main office relay R740 in order to condition the latter relay for operation in the special event that the present call is to be routed through the main office D; which is not the present case. Now, in the present case, since the call is to be routed inside the local area, the local area relays R710 and R730 occupy their operated positions so that the wiper 804 is selected and connected via the contacts 734 to one terminal of the lower winding of the main office relay R740; and the other terminal of the lower winding of the main office relay R740 is connected via the contacts 531, 542, 1218, 1148 and 1026 through the winding of the skip relay R970 and via the contacts 534 and 545 and through the upper winding of the send sequence relay R540 to battery potential. However, in the present example, the contact set in the contact bank D that is engaged by the wiper 804 is strapped to one of the pins 3Z that is, in turn, strapped via one of the conductors 822 to one of the X terminals in accordance with the first routing digit inside the local area, whereby the above traced series circuit is not completed so that the main office relay R740 is not operated at this time. Now at the conclusion of the application of ground potential to the PV(1425) conductor the upper winding of the cycle relay R720 is deenergized so that the latter relay is restored shortly thereafter and prior to the operation of the pickup relay R1140. Upon restoring, the cycle relay R720 recompletes, at the contacts 721, the path for short circuiting the lower winding of the main office relay R740 so as to terminate the present test. Now shortly thereafter ground potential is applied to the PU(1441) conductor completing a circuit, including the contacts 553, 1023, 1223, 971, 1131 and 1212, for operating the pick up relay R1140. Upon operating, the pickup relay R1140 effects the restoration of the interdigit relay R1220, in the manner previously explained; and completes, at the contacts 1141, a connection, including the contacts 1162 and 529, between the 101PS conductor 1416 and the pulse out conductor 306. As operation of the interrupter 1400 continues, ground impulses are applied to the 101PS conductor 1416, whereby the ground impulses are transmitted over the pulse out conductor 306 into the link 211 and consequently into the selector 212 in order to control operation thereof. As the ground potential is successively applied in the interrupter 1400 to the conductor SZ1, SZ2, etc., it is ultimately connected via one of the conductors 822 to the pin 3Z that is strapped to the contact set that is engaged by the selected wiper 804, whereby a circuit, including the contacts 734, 721, 531, 542, 1218 and 1147, is completed for energizing the upper winding of the pulse stop relay R1160; whereby the latter relay operates to complete, at the contacts 1163, a holding circuit for energizing the lower winding thereof; and to interrupt, at the contacts 1162, the path for transmitting the impulses over the pulse out conductor 306 in order to terminate the transmission of the first routing digit to the link 211 and consequently to the selector 212. The operation of the pulse stop relay R1160 brings about the subsequent operation of the interdigit relay R1220 in the manner previously explained; whereby the latter relay completes, at the contacts 1222, the chain circuit for energizing the upper winding of the send sequence relay R540 so as to cause the latter relay to operate through its first step, and to complete, at the contacts 546, the path for short-circuiting the lower winding thereof. At the conclusion of the present cycle of the interrupter 1400, the pickup relay R1140 restores; and in the beginning of the next cycle of operation of the interrupter 1400, the pulse start relay R1020 is operated to effect the restoration of the pulse stop relay R1160; whereby the send sequence relay R540 is operated through its second step to effect the restoration of the send sequence relay R530.

Also the send sequence relay R540 completes, at the contacts 544, a circuit for operating the send sequence relay R550 in series with the skip relay R970 by virtue of the presence of ground potential at the contacts 741. The circuit mentioned includes the contacts 741, 541, 552, 1218, 1148, 1026, 544 and 555, as well as the winding of the skip relay R970 and the upper winding of the send sequence relay R550. Accordingly, the send sequence relay R550 operates through its second step or completely to effect the restoration of the send sequence relay R540. The send sequence relay R550 effects the automatic operation of the send sequence relay R560 in a manner substantially identical to that described immediately above by virtue of the presence of ground potential at the contacts 743; the send sequence relay R560 effects the automatic operation of the send sequence relay R570 in a manner substantially identical to that described above by virtue of the presence of ground potential at the contacts 745; and the send sequence relay R570 effects the automatic operation of the send sequence relay R610 in a manner substantially identical to that described above by virtue of the presence of ground potential at the contacts 747. During the automatic operation of the relays R550, R560, R570 and R610, the skip relay R970 is retained in its operated position by virtue of the slow-to-release characteristic thereof so as to retain open, at the contacts 971, the circuit for operating the pickup relay R1140 in order positively to prevent operation of the latter relay until the send sequence relays R550, R560, etc., settle down.

In passing, it is noted that the send sequence relays R550, R560, etc., operate completely, as described immediately above, by virtue of the voltage drop through the winding of the skip relay R970 that is applied to the junction between the upper and lower windings thereof, so that when one of the send sequence relays R550, etc., operates to close its contacts 556, etc., the lower winding thereof is not short-circuited by the presence of ground potential upon the conductor 982. Thus, as noted, the send sequence relay R550, etc., operate fully in series with the skip relay R970 over the automatic circuits previously described.

At this time, the send sequence relay R610 occupies its fully operated position completing a connection to the wiper 807 and including the contacts 747′, 712 and 611; whereby the send sequence relay R620 is not immediately operated since the contact set in the contact bank E that is engaged by the wiper 807 is not connected to ground potential at this time. Thereafter when the skip relay R970 restores, it reprepares, at the contacts 971, a point in the circuit for operating the pickup relay R1140; and still later the pickup relay R1140 is operated to bring about the restoration of the interdigit relay R1220 in the manner previously explained. Also the pickup relay R1140 again connects, at the contacts 1141, the pulse out conductor 306 to the 101PS conductor 1416; and reconnects, at the contacts 1147, the upper winding of the pulse stop relay R1160 to the wiper 807. Accordingly, at this time, the second routing digit is sent from the 101PS conductor 1416 over the pulse out conductor 306 in the present cycle of operation of the interrupter 1400, whereupon the pulse stop relay R1160 is reoperated in the manner described. Specifically, the second routing digit that is sent over the pulse out conductor 306 is established by the strap between the engaged contact in the contact bank E and one of the pins 1Z and the further strapping between the pin 1Z and one of the X terminals. Upon operating the pulse stop relay R1160 terminates the second routing digit transmitted over the pulse out conductor 306, whereby the relays above described are recycled during a time when the send sequence relay R620 occupies its fully operated position bringing about the sending of the third routing digit based upon the contact set engaged by the wiper 806 and dependent upon the strapping between the engaged contact set in the contact bank H and one of the pins 4Z and the strapping between the one pin 4Z and one of the X terminals via one of the conductors 823. In this case, the circuit for energizing the upper winding of the pulse stop relay R1160 includes the contacts 631, 621, 714, 749′ and the wiper 806.

In view of the above description, it will be understood that the first routing digit was transmitted over the pulse out conductor 306 during the complete operation of the send sequence relay R530 and via the wiper 804 and the engaged contact in the associated contact bank D; the second routing digit was transmitted over the pulse out conductor 306 during the complete operation of the send sequence relay R610 and via the wiper 807 and the engaged contact in the associated contact bank E; and the third routing digit was transmitted over the pulse out conductor 306 during the complete operation of the send sequence relay R620 and via the wiper 806 and the engaged contact in the associated contact bank H.

Also, it is pointed out that in the event the second and third routing digits are not required, then the appropriate contact sets in the contact banks E and H are strapped via the respective pins 1Z and 4Z and the respective conductors 823 and 824 to the G terminal connected to the G(1448) conductor. In this case, automatic circuits are completed for operating the respective send sequence relays R620 and R630 and the skip relay R970. Accordingly, it will be understood that in the present instance, either one, two or three routing digits are transmitted over the pulse out conductor 306.

At this time, the relays noted are again recycled five times for the purpose of transmitting the five numerical digits registered in the five digit registers 1301, 1302, 1303, 1304 and 1305 during the times that the respective send sequence relays R630, R640, R650, R660 and R670 occupy their completely operated positions. For example, when the send sequence relay R630 occupies its fully operated position, the director 400 is conditioned to send the first numerical digit registered in the first digit register 1301; and the circuit for operating the pulse stop relay R1160 includes the contacts 632 and the first marking conductor 1381, which first marking conductor 1381 is connected via some combination of the contacts of the digit relays R1310, etc., to the corresponding one of the marking conductors in the cable 826 and thence via the appropriate one of the W terminals to the corresponding one of the X terminals and thence to the corresponding one of the SZ1, etc., conductors.

*Section 11.—Routing a call outside the local area independently of the main office*

Considering now the routing of a call outside the local area independently of the main office D, the operation of the director 400 at this time is generally the same as that described in Section 10, except that the local area relays R710 and R730 do not occupy their operated positions. Accordingly, in this case, during the complete operation of the send sequence R530, the first routing digit is sent over the pulse out conductor 306; and the circuit for operating the pulse stop relay R1160 includes the contacts 531, 721 and 733, the wiper 803, and the engaged contact in the associated contact bank C, the strapping to one of the pins 3Z, and the strapping via one of the conductors 819 to one of the X terminals. In this case, operation of the send sequence relay R540 effects automatic operation of the send sequence relays R550, R560, R570, R610, R620 and R630, via circuits respectively including the contacts 541, 551, 561, 571, 611 and 621; which circuits include ground, at the respective contacts 741, 743, 745, 747, 749 and 742'. During the complete operation of the send sequence relay R610, the automatic circuit includes the contacts 611, 711 and 749; and during the complete operation of the send sequence relay R620, the automatic circuit includes the contacts 621, 713 and 742'. Accordingly, in the present case, only one routing digit is transmitted over the pulse out conductor 306. The director 400 transmits the five numerical digits from the digit registers 1301, etc., during the complete operations of the send sequence relays R630, etc., in a manner identical to that described in Section 10.

*Section 12.—Routing a call inside the local area through the main office*

Considering now the routing of a call inside the local area through the main office D, the operation of the director 400 at this time is generally the same as that described in Section 10; and in this case, the local relays R710 and R730 occupy their operated positions. Also, in this case, the contact set in the contact bank D that is engaged by the wiper 804 is strapped to one of the pins 3Z and thence via the conductor 814 to the GPV terminal that is connected to the PV(1425) conductor. Thus in this case, during the complete operation of the send sequence relay R530, when the cycle relay R720 is operated, a direct circuit is completed for energizing the lower winding of the main office relay R740 in series with the winding of the skip relay R970 and the upper winding of the send sequence relay R540, so that the main office relay R740 operates. This circuit extends from the grounded wiper 804 via the contacts 734, the lower winding of the main office relay R740, the contacts 531, 542, 1218, 1148 and 1026, the winding of the skip relay R970, the contacts 534, and 545, and the upper winding of the send sequence relay R540 to battery. Upon operating, the main office relay R740 completes, at the contacts 744', a holding circuit, including the grounded hold conductor 1080 for energizing the upper winding thereof; and completes, at the contacts 746', a circuit, including the contacts 538, for connecting direct ground potential to one terminal of the winding of the skip relay R970. At this time, the send sequence relay R540 operates completely interrupting, at the contacts 545, the series circuit for energizing the upper winding thereof and the winding of the skip relay R970; whereby the skip relay R970 is restored shortly thereafter.

At this time, the completely operated send sequence relay R540 prepares a test connection between the upper winding of the pulse stop relay R1160 and the YA terminal; which connection includes the contacts 742 and 541. Thus the director 400 operates to transmit the predetermined routing digit corresponding to the strapping to the YA terminal in the cable 828; whereupon the pulse stop relay R1160 is operated causing recycling of the relays in the manner previously explained.

A second routing digit is then transmitted under the control of the send sequence relay R550 based upon the strapping to the YB terminal; and a third routing digit is then transmitted under the control of the send sequence relay R560 based upon the strapping to the YC terminal. Then the first office code digit is sent under the control of the send sequence relay R570 by virtue of the completion of the test circuit, including the contacts 571, 748, 732 and the terminal YD that is directly strapped by the conductor in the cable 828 to the X5 terminal; the first office code digit comprising the digit 5 that was initially absorbed by the drop-back of the route and zone switch 800, as explained in Section 4. Under the control of the send sequence relay R610 the second office code digit is sent; the circuit, including the contacts 611, 712 and 748' and the wiper 808 and the engaged contact in the associated contact bank F. Under the control of the send sequence relay R620, the third office code digit is sent; the circuit, including the contacts 621, 714 and 740' and the wiper 805 and the engaged contact in the associated contact bank G. The subsequent sending of the five numerical digits under the control of the send sequence relays R630, etc., from the digit registers 1301, etc., is the same as that previously described.

*Section 13.—Routing a call outside the local area through the main office*

Considering now the routing of a call outside the local area through the main office D, the operation of the director 400 at this time is generally the same as that described in Section 10, and in this case, the local relays R710 and R730 occupy their restored positions. Also, in this case, the contact set in the contact bank C that is engaged by the wiper 803 is strapped to one of the pins 3Z and thence via the conductor 814 to the GPV terminal that is connected to the PV(1425) conductor. Thus in this case during the complete operation of the send sequence relay R530, when the cycle relay R720 is operated, a direct circuit is completed for energizing the lower winding of the main office relay R740 in series with the winding of the skip relay R970 and the upper winding of the send sequence relay R540; whereby the main office relay R740 and the skip relay R970 are operated and the send sequence relay R540 is fully operated, as described in Section 12. In this case the predetermined first and second and third routing digits are respectively transmitted under the control of the send sequence relays R540, R550 and R560 as determined by the strapping to the terminals YA, YB and YC. When the send sequence relay R570 is fully operated, an alternative circuit for operating fully the send sequence relay R610 is completed by virtue of the application of ground potential over the skip circuit, including the contacts 731, 748 and 571. The first office code digit and the second office code digit are then sent under the respective controls of the send sequence relays R610 and R620 as determined by the positions of the respective wipers 808 and 805 that respectively engage contact sets in the contact banks F and G. The subsequent sending of the five numerical digits under the control of the send sequence relays R630, etc., from the digit registers 1301, etc., is the same as that previously described.

*Section 14.—Rerouting control*

At the outset, it is noted that calls that are normally routed through the main office D are not rerouted, but that calls that are normally routed independently of the main office D may possibly be rerouted through the main office D. The control concerning whether a call that is normally routed inside the local area independently of the main office D can possibly be rerouted through the main office D is established by the arrangement of straps between the various contact sets in the vertical control contact bank V and the G terminal that is connected to the G(1448) conductor, each case in the event of possible rerouting a strap being provided. Accordingly, when a call is registered in the director 400 that is normally routed inside the local area independently of the main office, as described in Section 10, a test circuit is prepared for operating the reroute relay R1230 incident to the operation of the register sequence relay R420, which test circuit includes the contacts 745′ of the restored main office relay R740, the contacts 733′ of the operated local area relay R730, and the contacts 427, and the vertical control wiper 809, as well as the engaged contact set in the associated vertical control contact bank V. At this time, in the event of possible rerouting, the strap between the engaged contact set in the vertical control contact bank V and the G terminal connected to the G(1448) conductor completes the circuit mentioned effecting operation of the reroute relay R1230. Upon operating, the reroute relay R1230 completes, at the contacts 1231 and 1232, a substantially identical circuit for operating the reroute relay R1240. Upon operating, the reroute relay R1240 interrupts, at the contacts 1243, one of the multiple points in the path for applying ground potential to the switch train release conductor 309; and prepares, at the contacts 1241, a point in the holding circuit traced hereinafter for energizing the upper winding of the reroute relay R1210.

At this time, the director 400 operates in the manner described in Section 10, and it may occur that the selector 212 encounters an all-trunks-busy condition in the switching route, whereby ground potential is returned over the pulse guard conductor 304 in order to prepare a point in a circuit traced hereinafter for energizing the lower winding of the reroute relay R1210. Now subsequently when the send sequence relay R640 is operated, the previously mentioned circuit for energizing the lower winding of the reroute relay R1210 is completed; this circuit extending from battery potential via the resistor 1180, the contacts 649 and 738, the lower winding of the reroute relay R1210, the contacts 1176 and 1154, to the grounded pulse guard conductor 304. When the lower winding of the reroute relay R1210 is thus energized, the latter relay operates to complete, at the contacts 1216, the holding circuit, including the contacts 1241 and the grounded hold conductor 1080, for energizing the upper winding thereof. Also the reroute relay R1210 completes, at the contacts 1215, a direct circuit, including the grounded hold conductor 1080, for energizing the upper windings of the main office relay R740 so as to cause the latter relay to operate and complete, at the contacts 744′, the holding circuit for energizing the upper winding thereof. Further, the reroute relay R1210 interrupts, at the contacts 1217, the path, including the contacts 1034, for applying ground potential to the switch train release conductor 309 so as to bring about the release of the selector 212; and completes, at the contacts 1219, a circuit, including the contacts 557 and the grounded conductor 982, for operating completely the send sequence relay R540 at this time. Further, the reroute relay R1210 interrupts, at the contacts 1214, a further point in the circuit traced hereinafter for operating the release relay R1130; and interrupts, at the contacts 1212, a further point in the circuit for operating the pickup relay R1140. Further, the reroute relay R1210 interrupts, at the contacts 1218, a further point in the circuit for energizing the winding of the skip relay R970; and interrupts, at the contacts 1211, the application of ground potential upon the conductor 1261 so as to bring about the restoration of any operated one of the send sequence relays R550, R560, etc. However, at this time, the operated send sequence relay R540 is retained in its operated position by virtue of the completed holding circuit for energizing the upper and lower windings thereof in series relation directly from the grounded conductor 982.

Upon operating, the main office relay R740 further interrupts, at the contacts 745′, the circuit for energizing the winding of the reroute relay R1230 so as to cause the latter relay to restore shortly thereafter, it being of the slow-to-release type. Upon restoring, the reroute relay R1230 interrupts, at the contacts 1232, the circuit for energizing the winding of the reroute relay R1240 in order to cause the latter relay to restore shortly thereafter, it being of the slow-to-release type. Upon restoring, the reroute relay R1240 interrupts, at the contacts 1241, the holding circuit for energizing the upper winding of the reroute relay R1210 in order to cause the latter relay to restore. During the time interval that the reroute relays R1210 and R1240 occupy their operated positions, ground potential is removed from the switch train release conductor 309 in order to bring about the release of the selector 212, as previously noted; and when these relays restore ground potential is returned, at the contacts 1217 and 1243, upon the switch train release conductor 309.

At this time, the send sequence relay R540 occupies its operated position and when ground potential is applied in the present cycle of operation of the interrupter 1400 to the PU(1441) conductor, the pickup relay R1140 is operated so as to connect the 10IPS conductor 1416 to the pulse out conductor 306. Now, the director 400 operates in a manner identical to that described in Section 12 to send the three predetermined routing digits followed by the three code digits as registered, whereby the present call is routed to the called office inside the local area through the main office D.

On the other hand, a call that is to be routed outside the local area independently of the main office D can always be rerouted through the main office D by virtue of the restored positions of the local area relays R710 and R730. Thus in this case, in the operation of the director 400 to bring about the zone metering control, as described in Section 8, the interdigit relay R1220 is operated; and upon operating the interdigit relay R1220 completes, at the contacts 1221, an alternative circuit, including the set of switch springs S1038 and the contacts 1032, 734′ and 745′, for operating the reroute relay R1230. Operation of the reroute relay R1230 effects operation of the reroute relay R1240; and in the event of encountering of an all-trunks-busy condition by the selector 212, the ground potential that is returned over the pulse guard conductor 304 effects operation of the reroute relay R1210 in the manner described above. Upon operating, the reroute relay R1210 effects the operation of the main office relay R740, the release of the selector 212, operation of the send sequence relay R540, and the release of any other operated one of the send sequence relays R550, etc., in the manner previously explained. In this case, the circuit for energizing the lower winding of the reroute relay R1210 is completed, at the contacts 659, incident to the operation of the send sequence relay R650, assuming, of course, that the selector 212 has encountered the all-trunks-busy condition and returned the ground potential upon the pulse guard conductor 304. At this time, the director 400 operates in a manner identical to that described in Section 13 to send the three predetermined routing digits followed by the two code digits as registered, whereby the present call is routed to the called office outside the local area through the main office D.

*Section 15.—Release of the director*

After the outgoing switch train beyond the selector 212 has operated to switch-through to the subscriber line extending to the called subscriber substation, it operates to interrupt the normal application of battery potential upon one of the line conductors extending thereto, whereby battery potential is removed from the pulse out conductor 306, which removal of battery potential from the pulse out conductor 306 effects a control of the test relay R1120, in the director 400 as explained more fully below. More particularly, after each digit is sent from the director 400, the cycle relay R720 is reoperated in the next cycle of operation of the interrupter 1400 shortly following the operation of the pulse start relay R1020. Upon operating the cycle relay R720 completes, at the contacts 723, a circuit, including the contacts 1222 of the operated interdigit relay R1220, for operating the control relay R1150. Upon operating the control relay R1150 completes, at the contacts 1151, a test circuit, including the contacts 1132, for connecting the upper winding of the test relay R1120 to the pulse out conductor 306, whereby the test relay R1120 is operated in the event the connector in the outgoing switch train has not yet switched-through as noted above. Upon operating, the test relay R1120 interrupts, at the contacts 1121, the normally completed path for short-circuiting the lower winding thereof; whereby a holding circuit, including the contacts 1024 and the grounded hold conductor 1080, is completed for energizing the lower winding thereof. Also upon operating, the control relay R1150 prepares, at the contacts 1153, a circuit for energizing the lower winding of the release relay R1150. Further, upon operating, the test relay R1120 interrupts, at the contacts 1122, a point in a holding circuit traced hereinafter for energizing in series relation the upper and lower winding of the release relay R1130. Subsequently in the cycle of operation of the interrupter 1400, when ground potential is removed from the PV(1425) conductor, the cycle relay R720 is restored effecting the restoration of the control relay R1150. Still subsequently in the cycle of operation of the interrupter 1400, when ground potential is removed from the PO(1424) conductor, the pulse start relay R1020 is restored interrupting, at the contacts 1024, the holding circuit for energizing the lower winding of the test relay R1120 in order to effect the restoration thereof. Now in the present instance, after the connector in the outgoing switch train has switched through battery potential is removed from the pulse out conductor 306 so that the test relay R1120 is not operated over the above traced circuit, including the upper winding thereof, incident to the operation of the control relay R1150. Accordingly, in this case, upon operating, the control relay R1150 completes, at the contacts 1153, the circuit for energizing the lower winding of the release relay R1130, which circuit also includes the contacts 1214 and the grounded hold conductor 1080. Now this circuit further includes the contacts 650′ of the operated send sequence relay R650 and the contacts 731′ in the event the local area relay R730 is operated; on the other hand, this circuit includes the contacts 669 of the operated send sequence relay R660 in the event the local area relay R730 is not operated. When the lower winding of the release relay R1130 is thus energized, the latter relay operates through its first step to complete, at the contacts 1133, a path, also including the contacts 1122 and 1061, for short-circuiting the upper winding thereof. This path is completed in the present case by virtue of the restored position of the test relay R1120. In the present cycle of operation of the interrupter 1400, the cycle relay R720 restores effecting the restoration of the control relay R1150; whereby the latter relay interrupts, at the contacts 1153, the above traced path for short-circuiting the upper winding of the release relay R1130. At this time; a series circuit is completed for energizing the upper and lower windings of the release relay R1130 that includes the contacts 1061, 1122 and 1133 and the grounded hold conductor 1080 so that the release relay R1130 is operated through its second step or completely.

In view of the foregoing, it will be understood that after the director 400 sends the digit that effects the switching-through operation of the connector in the outgoing switch train, battery potentential is removed from the pulse out conductor 306 so that the test relay R1120 is not reoperated following the sending of the digit mentioned so as to indicate that all necessary digits have been sent from the director 400. Accordingly, in this case, the operation of the control relay R1150 brings about the complete operation of the release relay R1130. Upon operating completely, the release relay R1130 interrupts, at the contacts 1132, a further point in the test circuit for energizing the upper winding of the test relay R1120; and interrupts, at the contacts 1134, a circuit for retaining operated the seizure relay R1040 so as to bring about the removal of battery potential from the director hold conductor 308. Also the release relay R1130 interrupts, at the contacts 1131, a further point in the circuit for operating the pickup relay R1140 so as to prevent further sending of digits from the director 400. Upon restoring, the seizure relay R1040 interrupts, at the contacts 1042, the circuit for retaining operated the hold relay R1030; whereby the latter relay interrupts, at the contacts 1033, the path for applying ground potential to the hold conductor 1080. During the transition time between the restoration of the seizure relay R1040 and the hold relay R1030 ground potential is removed from the finder hold conductor 302, at the contacts 1043 and 1036, in order to bring about the release of the director finder 213 so that the connections between the link 211 and the director 400 via the cable 300 are interrupted. When ground potential is removed from the hold conductor 1080 in the director 400 all of the operated relays therein are released including the tone relay R960. Further, the hold relay R1030 completes, at the contacts 1031, a circuit, including the set of switch springs S1038 for operating the release magnet M703 so that the wiper carriage of the route and zone switch 800 is released and returned into its normal rotary and vertical positions. When the route and zone switch 800 is thus released, the sets of switch springs S710, S725, S1038 and S1123 are operated. More particularly, the set of switch springs 1038 is operated to interrupt the circuit for operating the release magnet M703. Also operation of the set of switch springs S1123 recompletes the previously traced circuit, including the contacts 1036, 1044 and 1113, for reoperating the guard relay R910, so that the latter relay interrupts, at the contacts 913, the path for applying ground potential to the director guard conductor 301, and recompletes, at the contact 914, the path for applying battery potential via the resistor 919 to the director guard conductor 301. At this time, the director 400 is completely released and is marked by the application of battery potential upon the director guard conductor 301 as being idle to the various director finders 213, etc., having access thereto.

*Section 16.—Premature and timed release of the director*

In the event the subscriber at the called subscriber substation T1 should abandon the call before complete operation and subsequent release of the director 400, as explained above, the link 211 operates to interrupt the application of ground potential upon the director hold conductor 308 so as to effect the restoration of the seizure relay R1040 and the consequent restoration of the hold relay R1030; whereby the director 400 is released bringing about reoperation of the guard relay R910, all in the manner described in Section 15.

Considering now the matter of the permanent timing of the director 400, it is again noted that when the director 400 is seized, as explained in Section 3, the guard relay R910 restores, effecting the connection of the 30 second time pulse conductor 900 to the upper winding of the permanent timer relay R1050. Thereafter, when ground potential is applied to the conductor 900, the upper winding of the permanent timer relay R1050 is energized causing the latter relay to operate. Upon operating, the permanent timer relay R1050 completes, at the contacts 1052, a circuit, including the contacts 1071, for energizing the lower winding of the permanent timer relay R1070; whereby the latter relay operates through its first step to complete, at the contact 1074, a similar path, also including the contacts 415, 953 and 911, for short-circuiting the upper winding thereof. At the conclusion of the application of ground potential upon the conductor 900 the permanent timer relay R1050 restores interrupting, at the contacts 1052, a point in the path for short-circuiting the upper winding of the permanent timer relay R1070; whereby the upper and lower windings thereof are energized in series circuit relation causing the latter relay to operate through its second step or completely.

At this time, should the subscriber at the calling subscriber substantion T1 proceed with dialing, then the line relay R940 is operated to effect operation of the dial relay R950; whereby the latter relay upon operating interrupts, at the contacts 953, the previously traced holding circuit for energizing in series the upper and lower windings of the permanent timer relay R1070. On the other hand, should the subscriber at the calling subscriber substation T1 fail to dial within the next 30 seconds following the operation of the permanent timer relay R1070, the permanent timer relay R1050 is reoperated while the permanent timer relay R1070 occupies its operated position. When both of the permanent timer relays R1050 and R1070 occupy their operated positions, ground potential is removed, at the contacts 1053 and 1073, from the PG release conductor 307 so as to bring about the release of the finder 210 and the consequent operation of the line circuit 202 to lock the calling subscriber substation T1 out-of-service.

Also, at this time, the link 211, the finder 210, and the selector 212 are released bringing about the release of the director finder 213, in the manner described above. Also, in this case, when the permanent timer relay R1050 is operated while the permanent timer relay R1070 occupies its operated position, a holding circuit, including the contacts 1052 and 1072, is completed for energizing the lower winding of the permanent timer relay R1050 in multiple with the heating coil of the permanent timer relay T1060. Fifteen seconds following the completion of the above-mentioned circuit, the permanent timer relay T1060 operates to complete, at the contacts 1062, a direct circuit for energizing in series the upper and lower windings of the release relay R1130, so as to cause the latter relay to operate fully to bring about the release of the director 400, in the manner described in Section 15. In this case, when the guard relay R910 is reoperated, the holding circuit for retaining operated the permanent timer relay R1070 is interrupted, at the contacts 911, whereby the latter relay brings about the restoration of the permanent timer relays R1050 and T1060.

*Section 17.—Routing of toll calls*

In the extension of a toll call from the calling subscriber substation T1 in the office A to the toll switchboard in the main office D, the single digit "1" is registered in the director 400 after seizure thereof bringing about operation of the vertical magnet M700 to drive the wiper carriage of the route and zone switch 800 one step in the vertical direction away from its normal vertical position so that the set of switch springs S704 is operated. Also the line relay R940 effects operation of the dial relay R950, and completes, at the contacts 942, a circuit including the common conductor 946, the contacts 414, 923, 732′ and 1214, as well as the grounded hold conductor 1080, for charging the condenser 944 and for energizing the lower winding of the one-digit code relay R920 in series circuit relation causing the latter relay to operate. Upon operating, the one-digit code relay R920 completes, at the contacts 921, a holding circuit, including the contacts 515 and the grounded hold conductor 1080, for energizing the upper winding thereof; and prepares, at the contacts 922, a circuit traced hereinafter for energizing the lower winding of the two-digit code relay R930 (which circuit is not employed in the present instance since the digit 1 registered in the director 400 consists of only one impulse). Also upon operating the one-digit code relay R920 prepares, at the contacts 924, a circuit traced hereinafter for reoperating the line relay R940. At the conclusion of the present digit 1 and in the cycle of operation of the interrupter 1400, the cycle relay R720 is operated completing, at the contacts 724, the previously mentioned circuit, including the contacts 426, 924 and 933, for energizing the upper winding of the line relay R940 so as to cause the latter relay to reoperate and subsequently the cycle relay R720 restores effecting the restoration of the line relay R940. Accordingly, the line relay R940 operates and restores effecting operation of the dial relay R950 and the transmission of a single impulse, at the contacts 943, to the rotary magnet M701, whereby the wiper carriage of the route and zone switch 800 is driven one step in the rotary direction. Accordingly, at this time, the wipers carried by the wiper carriage of the switch 800 engage the 1 up-1 contact sets in the associated contact banks.

Upon the restoration of the dial relay R950 following the restoration of the line relay R940, the register sequence relay R430 is operated effecting the restoration of the register sequence relay R420. Upon restoring, the register sequence relay R420 interrupts, at the contacts 424, the path for short-circuiting the lower winding of the send sequence relay R510 causing the latter relay to operate through its second step or completely at this time. When the send sequence relay R510 is thus operated, it interrupts, at the contacts 515, the holding circuit for energizing the upper winding of the one-digit code relay R920 so as to cause the latter relay to restore.

The subsequent operation of the director 400 to send a series of routing digits is fundamentally the same as that described in Section 11, as the local area relays R710 and R730 do not occupy their operated positions at this time, since the present call is not to be routed through the main office D but rather is to be routed to the toll switchboard disposed in the main office D. Of course, in the present example, the contact set in the contact bank A engaged by the selected wiper 801 is not strapped through the pins 2Z to the GPV terminal since an assigned code has been registered in the director 400; but rather the contact set mentioned is strapped via the pins 2Z to the GPU terminal since metering is not required. Accordingly, the unassigned code relay R1010 is not operated, and when the send sequence relay R520 is operated the automatic circuit for operating the send sequence relay R530 is completed by the ground potential applied to the GPU terminal. Upon operating, the send sequence relay R530 brings about the sending of the first routing digit as determined by the strapping to the contact set in the contact bank C that is engaged by the selected wiper 803. Thereafter the send sequence relays R540, R550, R560, R570, R610, R620 and R630 are operated in a manner identical to that described in Section 11.

Upon operating, the send sequence relay R630 prepares, at the contacts 631′ a circuit, including the contacts 706 of the operated set of switch springs S704, for energizing the lower winding of the release relay R1130; and prepares, at the contacts 632′, a circuit, also including the contacts 707 of the operated set of switch springs S704, for energizing the lower winding of the reroute relay R1210. Since the call is to be routed via one of the trunk lines 107 to the toll switchboard in the main office D, the rerouting facility is of no utility in the present arrangement, but might have been useful in an arrangement (not disclosed) where a toll switchboard is provided in an office other than the main office D in conjunction with the provision of the toll switchboard in the main office D. Accordingly, in the present case, the above-mentioned circuit for energizing the lower winding of the release relay R1130 is completed incident to the operation of the control relay R1150 under the control of the cycle relay R720, whereby the release of the director 400 is the same as that described in Section 15.

*Section 18.—Routing of special service calls*

In the extension of a special service call from the calling subscriber substation T1 in the office A to the operator switchboard in the main office D, the two-digit code 31 is registered in the director 400 after seizure thereof bringing about operation of the vertical magnet M700 to drive the wiper carriage of the route and zone switch 800 three steps in the vertical direction away from its normal vertical position so that the set of switch springs S704 is operated in response to the first digit 3. Also the line relay R940 effects operation of the dial relay R950 and completes at the first operation thereof, at the contacts 942, the previously traced circuit for operating the one-digit code relay R920. Upon the second operation of the line relay R940, it completes, at the contacts 942, a substantially identical circuit, including the common conductor 946 and the contacts 414, 932, 922, 732′ and 1214 and the grounded hold conductor 1080, for energizing the lower winding of the two-digit code relay R930 via the condenser 944. Accordingly, in this case, since the first digit comprises more than one impulse, both the one-digit code relay R920 and the two-digit code relay R930 are operated. Upon operating, the two-digit code relay R930 completes, at the contacts 931, a holding circuit, including the contacts 515 and the grounded hold conductor 1080, for energizing the winding thereof; and interrupts, at the contacts 933, the previously traced automatic circuit for reoperating the line relay R940. Accordingly, in the present example, during the registration of the first digit 3, the two relays R920 and R930 are operated along with the vertical magnet M700. On the second digit 1, the rotary magnet M701 is operated; whereby at the conclusion thereof, the wiper carriage of the route and zone switch 800 occupies its 3 up-1 in position. The subsequent operation of the director 400 to transmit an appropriate routing digit based upon the strapping to the contact set in the contact bank C that is engaged by the wiper 803 is the same as that described in Section 17 in conjunction with the one-digit toll call to the toll switchboard in the main office D. Accordingly, in the present example, the director 400 transmits a single routing digit appropriate to effect routing of the special service call via one of the trunk lines 106 to the operator switchboard in the main office D at which special services are rendered.

*Section 19.—Registering and sending of cumulative digits*

In view of the foregoing explanation of the mode of operation of the director 400, it will be understood that it is primarily designed to receive either 7 or 8 digits, but under certain conditions, it is possible to cause it to register and then to send an indefinite number of digits without translation. More particularly, the fifth numerical digit is registered in the fifth digit register 1305 during the time that the register sequence relay R470 occupies its operated position, as explained in Section 6; whereby the operated register sequence relay R470 prepares, at the contacts 471, a circuit for energizing the upper winding of the control relay R480. Now during the registration of the fifth numerical digit, the dial relay R950 occupies its operated position, completing, at the contacts 952, a circuit, including the set of switch springs S1038 and the contacts 471, for energizing the upper winding of the control relay R480; whereby the latter relay operates. Upon operating, the control relay R480 interrupts, at the contacts 484, the normally completed path for short-circuiting the lower winding thereof. Also, the control relay R480 completes, at the contacts 483, a circuit, including the set of switch springs S1038 and the contacts 952 and 432, for energizing the upper winding of the register sequence relay R430; whereby the latter relay operates through its first step, completing, at the contacts 433, a path for short-circuiting the lower winding thereof. At the conclusion of dialing of the fifth numerical digit, the line relay R940 is retained in its restored position effecting the restoration of the dial relay R950 shortly thereafter; whereby the latter relay interrupts, at the contacts 952, the path for short-circuiting the lower winding of the register sequence relay R430; whereby the latter relay operates through its second step or completely. Also, at this time, a holding circuit is completed for energizing the lower winding of the control relay R480 in series with any operated one of the digit relays R1310, etc., in the first digit register 1301 in the special event that a digit remains registered in the first digit register 1301. The holding circuit mentioned extends, if completed, via the first hold conductor 1371 and includes the contacts 643, 1255 and 961. On the other hand, in the event there is no digit register in the first digit register 1301 at this time, the holding circuit for energizing the lower winding of the control relay R480 is not completed since each of the digit relays R1310, etc., in the first digit register 1301 occupies its restored position.

First assuming that the holding circuit for energizing the lower winding of the control relay R480 is completed by virtue of the registration of a digit in the first digit register 1301 at this time, whereby a circuit is completed for energizing the upper winding of the unassigned code relay R1010 as soon as dialing of the next digit is initiated; the circuit mentioned, including the contacts 482, 431 and 952 and the set of switch springs S1038. Upon operating, the unassigned code relay R1010 interrupts, at the contacts 1012, the holding circuit for energizing the upper winding of the tone relay R960 causing the latter relay to restore and complete at the contacts 968, the path for returning busy-tone current over the pulse-in conductor 305 indicating to the subscriber at the calling subscriber substation T1 that no further digits may be dialed at this time.

Now assuming that the hold circuit for energizing the lower winding of the control relay R480 is not completed by virtue of the prior clearing out of the first numerical digit from the first digit register 1301. Thus in this case, when the next digit is dialed at the calling subscriber substation T1, the operated sequence relay R430 effects registration thereof in the first digit register 1301. Subsequent digits may be registered in a like manner in the second, etc., digit registers 1302, etc., as the register sequence relays R440, etc., are sequentially reoperated.

In this case, it is pointed out that during the sending of the fifth numerical digit registered for the first time in the fifth digit register 1305, the send sequence relay R670 occupies its operated position thereby preparing, at the contacts 674, a circuit for energizing the lower winding of the control relay R1250, which circuit is completed incident to the operation of the interdigit relay R1220 following the transmission of the fourth numerical digit mentioned. This circuit includes when completed the contacts 1222, 1161, 674 and 1173; whereby the control relay R1250 upon operating completes, at the contacts 1252, a holding circuit, including the grounded hold conductor 1080 for energizing the lower winding thereof. Also upon operating the control relay R1250 completes, at the contacts 1254, an alternative circuit for energizing the lower winding of the line relay R940 via the dial tone conductor C1299 so that dial tone current induced in the upper winding of the line relay R940 is again returned over the pulse-in conductor 305 to the calling subscriber substation T1 indicating to him that he may proceed with the dialing of the cumulative digits above described. The subscriber at the calling subscriber substation T1 then proceeds to dial the cumulative digits as explained above, whereby they are registered in the digit registers 1301, 1302, etc. Now during the first registration of the cumulative digit in the first digit register 1301, the dial relay R950 occupies its operated position completing, at the contacts 952, a circuit including the set of switch springs S1038, 431, 481, 442 and 1251, for energizing the upper winding of the control relay R1250. At this time, both the upper and lower windings of the control relay R1250 are energized, whereby the latter relay restores as it is of the differential type, interrupting at the contacts 1251 and 1252, the respective circuits for energizing the upper and lower windings thereof. Further, the control relay R1250 interrupts, at the contacts 1254, the previously traced circuit including the dial tone conductor 1299 for bringing about the return of dial tone current to the calling subscriber substation T1. Incident to the initial operation of the control relay R1250, there was completed, at the contacts 1253, a circuit for operating the control relay R1170, whereby the latter relay upon operating completes, at the contacts 1175, a holding circuit for energizing the winding thereof. Also upon operating the control relay R1170 prepares, at the contacts 1174, a chain circuit between the contacts 674 of the send sequence relay R670 and the contacts 637 of the send sequence relay R630 so that the sending operation of the cumulative digits registered in the digit registers 1301, etc., always proceed forwardly from the send sequence relay R630 toward the send sequence relay R670.

In view of the foregoing, it will be understood that the five cumulative digits may be successively registered in the digit registers 1301, etc., under the control of the register sequence relays R430, etc., and are subsequently sent under the control of the send sequence relays R630, etc. Moreover, a plurality of sets of five cumulative digits may be repeatedly registered and sent in the manner described above.

*Section 20.—Conclusions*

In view of the foregoing, it is apparent that there has been provided in a telephone system an improved arrangement of the directors, wherein the directors are selectively controllable over any one of a plurality of links connectible thereto for the purpose of governing the extension of the connection via automatic switching apparatus terminating the connected link, and wherein the coordinate control of each of the directors is governed by a code interrupter common to the directors.

While there has been described what is, at present, considered to be the preferred embodiment of the invention, it will be understood that various modifications may be made therein, and it is intended to cover in the appended claims all such modifications as fall within the true spirit and scope of the invention.

What is claimed is:

1. In a telephone system, a plurality of directors, and an interrupter common to said directors; said interrupter being operative through successive cycles to transmit to each of said directors in each cycle thereof a series of control impulses and a series of switch-setting impulses; each of said directors comprising an incoming channel, an outgoing channel, an office register, means for registering in said office register a called office code transmitted over said incoming channel, route mechanism selectively controlled by said office register and governed by said registered called office code for selectively establishing a routing digit having a variable value, a normally restored switch having an operated position connecting said interrupter to said outgoing channel so that the switch-setting impulses transmitted from said interrupter are sent over said outgoing channel, means governed by certain of the control impulses transmitted in a given cycle of said interrupter for operating said switch, and means controlled by other of the control impulses transmitted in said given cycle of said interrupter and governed in response to the sending over said outgoing channel of a number of the switch-setting impulses corresponding to the value of said established routing digit for restoring said switch.

2. In a telephone system, a plurality of directors, and an interrupter common to said directors; said interrupter being operative through successive cycles to transmit to each of said directors in each cycle thereof a series of control impulses and a series of switch-setting impulses; each of said directors comprising an incoming channel, an outgoing channel, an office register, means for registering in said office register a called office code transmitted over said incoming channel, route mechanism selectively controlled by said office register and governed by said registered called office code for selectively establishing a plurality of routing digits having variable values, a send-sequence mechanism having a plurality of positions successively selecting said established routing digits, means controlled by said office register and governed by the registration of said called office code therein for operating said send-sequence mechanism into its first position to select said established first routing digit, a normally restored switch having an operated position connecting said interrupter to said outgoing channel so that the switch-setting impulses transmitted from said interrupter are sent over said outgoing channel, means governed by certain of the control impulses transmitted in a given cycle of said interrupter for operating said switch, means controlled by other of the control impulses transmitted in said given cycle of said interrupter and governed in response to the sending over said outgoing channel of a number of the switch-setting impulses corresponding to the value of said established first routing digit for restoring said switch, and means controlled by certain of the control impulses transmitted in the next cycle of said interrupter for operating said send-sequence mechanism into its second position to select said established second routing digit and for reoperating said switch.

3. In a telephone system, a plurality of directors, and an interrupter common to said directors; said interrupter being operative through successive cycles to transmit to each of said directors in each cycle thereof a series of control impulses and a series of switch-setting impulses; each of said directors comprising an incoming channel, and outgoing channel, a plurality of digit registers, means for registering in successive ones of said digit registers successive digits of variable values transmitted over said incoming channel, a send-sequence mechanism having a plurality of positions successively selecting said digit registers, means for operating said send-sequence mechanism into its first position to select said first digit register, a normally restored switch having an operated position connecting said interrupter to said outgoing channel so that the switch-setting impulses transmitted from said interrupter are sent over said outgoing channel, means governed by certain of the control impulses transmitted in a given cycle of said interrupter for operating said switch, means controlled by other of the control impulses transmitted in said given cycle of said interrupter and governed in response to the sending over said outgoing channel of a number of the switch-setting impulses corresponding to the value of the digit registered in said first digit register for restoring said switch, and means controlled by certain of the control impulses transmitted in the next cycle of said interrupter for operating said send-sequence mechanism into its second position to select said second digit register and for reoperating said switch.

4. In a telephone system, a plurality of directors, and an interrupter common to said directors; each of said directors comprising an incoming channel, an outgoing channel, an office register, means for registering in said office register a called office code transmitted over said incoming channel, a set of digit terminals, means controlled by said office register and governed by said registered called office code for selecting over a first path one of said digit terminals and for selecting over a second path one of said digit terminals, a sequence mechanism having first and second positions, means controlled by the registration in said office register of said called office code for operating said sequence mechanism into its first position, means controlled by said interrupter and by said sequence mechanism in its first position and governed by the one of said digit terminals selected via said first path for sending a corresponding first routing digit over said outgoing channel and then for operating said sequence mechanism into its second position, and means controlled by said interrupter and by said sequence mechanism in its second position and governed by the one of said digit terminals selected via said second path for sending a corresponding second routing digit over said outgoing channel.

5. In a telephone system, a plurality of directors, and an interrupter common to said directors; each of said directors comprising an incoming channel, an outgoing channel, a plurality of registers, a set of digit terminals, means for successively operating said digit registers successively to register digits transmitted over said incoming channel, each of said digit registers being operative to register a given digit by selecting over a path individual thereto a corresponding one of said digit terminals, a sequence mechanism having successive access to said digit registers, means for operating said sequence mechanism to select a first of said digit registers, a digit sender, means controlled by said interrupter and by the selection of said first digit register and governed by the one of said digit terminals selected via the path individual to said first digit register for sending a corresponding first digit over said outgoing channel and then for operating said sequence mechanism to select a second of said digit registers, and means controlled by said interrupter and by the selection of said second digit register and governed by the one of said digit terminals selected via the path individual to said second digit register for sending a corresponding second digit over said outgoing channel.

6. In a telephone system, a plurality of directors, and an interrupter common to said directors; each of said directors comprising an incoming channel, an outgoing channel, an office register, means for registering in said office register a called office code transmitted over said incoming channel, a set of digit terminals, a signal terminal, means controlled by said office register and governed in the event said registered called office code is assigned for selecting one of said digit terminals and governed in the event said registered called office code is unassigned for selecting said signal terminal, and means controlled by said interrupter and governed by the selection of one of said digit terminals for sending a corresponding routing digit over said outgoing channel and governed by the selection of said signal terminal for sending a busy signal over said incoming channel.

7. In a telephone system, a plurality of directors, and an interrupter common to said directors; each of said directors comprising an incoming channel, an outgoing channel, a timer, means responsive to seizure over said incoming channel for initiating operation of said timer, an office register, means for registering in said office register a called office code transmitted over said incoming channel, means controlled by the registration of said called office code in said office register for arresting operation of said timer, means controlled by operation of said timer a predetermined time interval for sending a busy signal over said incoming channel, a set of digit terminals, a signal terminal, means controlled by said office register and governed in the event said registered called office code is assigned for selecting one of said digit terminals and governed in the event said registered called office code is unassigned for selecting said signal terminal, and means controlled by said interrupter and governed by the selection of one of said digit terminals for sending a corresponding routing digit over said outgoing channel and governed by the selection of said signal terminal for sending a busy signal over said incoming channel.

8. In a telephone system, a plurality of directors, and an interrupter common to said directors; each of said directors comprising an incoming channel, an outgoing channel, an office register, means for registering in said office register a called office code transmitted over said incoming channel, a set of digit terminals, means controlled by said office register and governed by said registered called office code for selecting over a first path one of said digit terminals and for selecting over a second path one of said digit terminals, a sequence mechanism having first and second positions, means controlled by the registration in said office register of said called office code for operating said sequence mechanism into its first position, means controlled by said interrupter and by said sequence mechanism in its first position and governed by the one of said digit terminals selected via said first path for sending a corresponding zone digit over said incoming channel and then for operating said sequence mechanism into its second position, and means controlled by said interrupter and by said sequence mechanism in its second position and governed by the one of said digit terminals selected via said second path for sending a corresponding routing digit over said outgoing channel.

9. In a telephone system, a plurality of directors, and an interrupter common to said directors; each of said directors comprising an incoming channel, an outgoing channel, an office register, means for registering in said office register a called office code transmitted over said incoming channel, a set of digit terminals, a control terminal, means controlled by said office register and governed in the event said registered called office code identifies a metered call for selecting over a first path one of said digit terminals and governed in the event said registered called office code identifies a non-metered call for selecting said control terminal, additional means controlled by said office register and governed by said registered called office code for selecting over a second path one of said digit terminals, a sequence mechanism having first and second positions, means controlled by the registration in said office register of said called office code for operating said sequence mechanism into its first position, means controlled by said interrupter and by said sequence mechanism in its first position and governed by the one of said digit terminals selected via said first path for sending a corresponding zone digit over said incoming channel and then for operating said sequence mechanism into its second position, additional means controlled by said interrupter and by said sequence mechanism in its first position and governed by the selection of said control terminal for immediately operating said sequence mechanism into its second position, and means controlled by said interrupter and by said sequence mechanism in its second position and governed by the one of said digit terminals selected via said second path for sending a corresponding routing digit over said outgoing channel.

10. In a telephone system, a plurality of directors, and an interrupter common to said directors; each of said directors comprising an incoming channel, an outgoing channel, an office register, means for registering in said office register a called office code transmitted over said incoming channel, a set of digit terminals, a signal terminal, a control terminal, means controlled by said office register and governed in the event said registered called office code is assigned and identifies a metered call for selecting over a first path one of said digit terminals and governed in the event said registered called office code is assigned and identifies a non-metered call for selecting said control terminal and governed in the event said registered called office code is unassigned for selecting said signal terminal, additional means controlled by said office register and governed in the event said registered called office code is assigned for selecting over a second path one of said digit terminals, a sequence mechanism having first and second and third positions, means controlled by the registration in said office register of said called office code for operating said sequence mechanism into its first position, means controlled by said interrupter and by said sequence mechanism in its first position and governed in the event said signal terminal is selected for sending a busy signal over said incoming channel and governed in the event said signal terminal is not selected for operating said sequence mechanism into its second position, means controlled by said interrupter and by said sequence mechanism in its second position and governed by the selection of one of said digit terminals via said first path for sending a corresponding zone digit over said incoming channel and then for operating said sequence mechanism into its third position, additional means controlled by said interrupter and by said sequence mechanism in its second position and governed by the selection of said control terminal for immediately operating said sequence mechanism into its third position, and means controlled by said interrupter and by said sequence mechanism in its third position and governed by the selection of one of said digit terminals via said second path for sending a corresponding routing digit over said outgoing channel.

11. In a telephone system, a director, an interrupter, a pick-up conductor and a send conductor and a set of ten mark conductors each extending between said director and said interrupter; said interrupter being operative through successive cycles to transmit in each cycle first an impulse over said pick-up conductor and then alternate impulses over said send conductor and successive ones of said mark conductors; said director comprising an incoming channel, an outgoing channel, an office register, means for registering in said office register a called office code transmitted over said incoming channel, means controlled by said office register and governed by said registered called office code for establishing a routing digit having a given value by selecting a corresponding one of said mark conductors, a pick-up relay, means responsive to the transmission of an impulse over said pick-up conductor for controlling said pick-up relay, means responsive to said control of said pick-up relay for connecting said send conductor to said outgoing channel so that impulses subsequently transmitted over said send conductor are sent over said outgoing channel, a stop relay, means responsive to the transmission of an impulse over the selected one of said mark conductors for controlling said stop relay, and means responsive to said control of said stop relay for disconnecting said send conductor from said outgoing channel so that impulses subsequently transmitted over said send conductor are not sent over said outgoing channel, whereby the number of impulses sent over said outgoing channel between the control of said pick-up relay and the control of said stop relay corresponds to the value of said established routing digit.

12. In a telephone system, a director, an interrupter, a pick-up conductor and a send conductor and a set of ten mark conductors each extending between said director and said interrupter; said interrupter being operative through successive cycles to transmit in each cycle first an impulse over said pick-up conductor and then alternate impulses over said send conductor and successive ones of said mark conductors; said director comprising an incoming channel, an outgoing channel, a digit register, means for registering in said digit register a digit transmitted over said incoming channel, means controlled by said digit register and governed by said registered digit for selecting a corresponding one of said mark conductors, a pick-up relay, means responsive to the transmission of an impulse over said pick-up conductor for controlling said pick-up relay, means responsive to said control of said pick-up relay for connecting said send conductor to said outgoing channel so that impulses subsequently transmitted over said send conductor are sent over said outgoing channel, a stop relay, means responsive to the transmission of an impulse over the selected one of said mark conductors for controlling said stop relay, and means responsive to said control of said stop relay for disconnecting said send conductor from said outgoing channel so that impulses subsequently transmitted over said send conductor are not sent over said outgoing channel, whereby the digit registered in said digit register is sent over said outgoing channel.

13. In a telephone system, a director, an interrupter, a pick-up conductor and a send conductor and a set of ten mark conductors each extending between said director and said interrupter; said interrupter being operative through successive cycles to transmit in each cycle first an impulse over said pick-up conductor and then alternate impulses over said send conductor and successive ones of said mark conductors; said director comprising an incoming channel, an outgoing channel, a plurality of digit registers, means including register-sequence mechanism for registering in successive ones of said digit registers successive digits transmitted over said incoming channel, each of said digit registers being operative to register a variable digit by selecting corresponding ones of said mark conductors, a send-sequence mechanism having successive positions selecting successive ones of said digit registers, means for operating said send-sequence mechanism into a first of its positions selecting the first of said digit registers, a pick-up relay, means responsive to the transmission of an impulse in a first cycle of said interrupter over said pick-up conductor for operating and subsequently restoring said pick-up relay, said pick-up relay being operative to connect said send conductor to said outgoing channel so that impulses subsequently transmitted in said first cycle of said interrupter over said send conductor are sent over said outgoing channel, a stop relay, means responsive to the transmission of an impulse in said first cycle of said interrupter over the one of said mark conductors selected by said first digit register for operating said stop relay, said stop relay being operative to disconnect said send conductor from said outgoing channel so that impulses subsequently transmitted in said first cycle of said interrupter over said send conductor are not sent over said outgoing channel, whereby the digit registered in said first digit register is sent over said outgoing channel, an interdigit relay, means responsive to operation of said stop relay for operating said interdigit relay, means controlled in a second cycle of said interrupter for restoring said stop relay and said interdigit relay, means responsive to the restoration of said stop relay for operating said send-sequence mechanism into a second of its positions selecting the second of said digit registers, and means responsive to the restoration of said interdigit relay and to the transmission of an impulse in said second cycle of said interrupter over said pick-up conductor for again operating and subsequently restoring said pick-up relay.

14. The combination set forth in claim 13, wherein said register-sequence mechanism essentially comprises a series of counting relays successively operative to select successive ones of said digit registers.

15. The combination set forth in claim 13, wherein said send-sequence mechanism essentially comprises a series of counting relays successively operative to select successive one of said digit registers.

16. In a telephone system, a director comprising an incoming channel, an outgoing channel, a primary-secondary motions switch mechanism provided with first and second wiper sets and a primary magnet and a secondary magnet and a release magnet, a digit register, means responsive to a first digit transmitted over said incoming channel for selectively operating said primary magnet, a relay having a restored position selecting said first wiper set and an operated position selecting said second wiper set, means responsive to a given primary operation of said switch mechanism for operating said relay, means responsive to operation of said relay for operating said release magnet, means responsive to a second digit transmitted over said incoming channel for selectively operating said secondary magnet in the event said relay is restored and for selectively reoperating said primary magnet in the event said relay is operated, means responsive to a third digit transmitted over said incoming channel for registering the same in said digit register in the event said relay is restored and for selectively operating said secondary magnet in the event said relay is operated, and means controlled jointly by the composite operated position of said switch mechanism and by the selected one of said wiper sets for sending one or more variable routing digits over said outgoing channel.

17. The combination set forth in claim 16, wherein said switch mechanism is a Strowger mechanism and the primary and secondary motions thereof are the respective vertical and rotary motions thereof.

18. In a telephone system, a director comprising an incoming channel, an outgoing channel, a primary-secondary motions switch mechanism provided with first and second wiper sets and a primary magnet and a secondary magnet and a release magnet, a digit register, means responsive to a first digit transmitted over said incoming channel for selectively operating said primary magnet, a first relay having a restored position selecting said first wiper set and an operated position selecting said second wiper set, means responsive to a given primary operation of said switch mechanism for operating said first relay, means responsive to operation of said first relay for operating said release magnet, means responsive to a second digit transmitted over said incoming channel for selectively operating said secondary magnet in the event said first relay is restored and for selectively reoperating said primary magnet in the event said first relay is operated, means responsive to a third digit transmitted over said incoming channel for registering the same in said digit register in the event said first relay is restored and for selectively operating said secondary magnet in the event said first relay is operated, a second relay, means controlled jointly by certain composite operated positions of said switch mechanism and by the selected one of said wiper sets for operating said second relay, and means controlled jointly by the composite operated position of said switch mechanism and by the selected one of said wiper sets and by the positions of said second relay for sending one or more variable routing digits over said outgoing channel.

19. The combination set forth in claim 18, wherein said sending means is jointly controlled by the selection of said first wiper set and by the restored position of said second relay for sending a first set of digits over said outgoing channel and is jointly controlled by the selection of said first wiper set and by the operated position of said second relay for sending a second set of digits over said outgoing channel and is jointly controlled by the selection of said second wiper set and by the restored position of said second relay for sending a third set of digits over said outgoing channel and is jointly controlled by the selection of said second wiper set and by the operated position of said second relay for sending a fourth set of digits over said outgoing channel.

20. In a telephone system, a director comprising an incoming channel, an outgoing channel, a primary-secondary motions switch mechanism provided with first and second wiper sets and a primary magnet and a secondary magnet and a release magnet, a digit register, means responsive to a first digit transmitted over said incoming channel for selectively operating said primary magnet, a first relay having a restored position selecting said first wiper set and an operated position selecting said second wiper set, means responsive to a given primary operation of said switch mechanism for operating said first relay, means responsive to operation of said first relay for operating said release magnet, means responsive to a second digit transmitted over said incoming channel for selectively operating said secondary magnet in the event said first relay is restored and for selectively reoperating said primary magnet in the event said first relay is operated, means responsive to a third digit transmitted over said incoming channel for registering the same in said digit register in the event said first relay is restored and for selectively operating said secondary magnet in the event said first relay is operated, a digit sender, means controlled jointly by the composite operated position of said switch mechanism and by the selected one of said wiper sets for operating said digit sender to send a variable first set of routing digits over said outgoing channel, a second relay operated in response to the return of a busy signal over said outgoing channel, a third relay, means responsive to operation of said second relay for sending a switch-release signal over said outgoing channel and for operating said third relay, and means controlled jointly by the composite operated position of said switch mechanism and by the selected one of said wiper sets and by the operated position of said third relay for reoperating said digit sender to send a variable second set of routing digits over said outgoing channel.

21. In a telephone system, a director comprising an incoming channel, an outgoing channel, a primary-secondary motions switch mechanism provided with first and second wiper sets and a primary magnet and a secondary magnet and a release magnet, a digit register, means responsive to a first digit transmitted over said incoming channel for selectively operating said primary magnet, a first relay having a restored position selecting said first wiper set and an operated position selecting said second wiper set, means responsive to a given primary operation of said switch mechanism for operating said first relay, means responsive to operation of said first relay for operating said release magnet, means responsive to a second digit transmitted over said incoming channel for selectively operating said secondary magnet in the event said first relay is restored and for selectively reoperating said primary magnet in the event said first relay is operated, means responsive to a third digit transmitted over said incoming channel for registering the same in said digit register in the event said first relay is restored and for selectively operating said secondary magnet in the event said first relay is operated, a second relay, means controlled jointly by certain composite operated positions of said switch mechanism and by the selected one of said wiper sets for operating said second relay, a digit sender, means controlled jointly by the composite operated position of said switch mechanism and by the selected one of said wiper sets and by the position of said second relay for operating said digit sender to send a variable first set of routing digits over said outgoing channel, a third relay operated in response to the return of a busy signal over said outgoing channel, means responsive to operation of said third relay and governed in the event said second relay occupies its operated position for returning a busy signal over said incoming channel and governed in the event said second relay occupies its restored position for sending a switch-release signal over said outgoing channel and for operating said second relay, and means responsive to said last-mentioned operation of said second relay and controlled jointly by the composite operated position of said switch mechanism and by the selected one of said wiper sets for reoperating said digit sender to send a variable second set of routing digits over said outgoing channel.

22. In a telephone system, a director comprising an incoming channel, an outgoing channel, a plurality of register relays operative in different combinations to register the different values of a digit, a condenser, a master conductor, a line relay controllable by a variable series of impulses transmitted over said incoming channel and representing different values of a digit so that said line relay is operated and restored intermittently in a corresponding manner, impulse contacts controlled by said line relay for connecting said condenser to said master conductor and for short-circuiting said condenser in the respective positions of said line relay, switching contacts controlled by said register relays for selectively connecting and disconnecting said register relays with respect to said master conductor, a source of current supply, said switching contacts being so arranged that each time said condenser is connected to said master conductor it is charged in series with the winding of only one of said register relays from said source of current supply, marking contacts controlled in different combinations by said register relays in accordance with the different operated positions thereof to register the different values of a digit, an impulse sender, and means controlled by said marking contacts for selectively operating said impulse sender to send a variable series of impulses representing the different values of a digit over said outgoing channel.

23. The combination set forth in claim 22, wherein the capacitance of said condenser is related to the operating current of the winding of any one of said register relays so that the energization of the winding of only one of said register relays substantially completely charges said condenser.

24. In a telephone system, a director comprising an incoming channel, an outgoing channel, a plurality of digit registers, a dial-tone source, a register-sequence mechanism having successive access to said digit registers, means responsive to seizure over said incoming channel for operating said register-sequence mechanism to select the first of said digit registers and for connecting said dial-tone source to said incoming channel, register means responsive to the transmission of a first digit over said incoming channel for registering the first digit in said first digit register and then for operating said register-sequence mechanism to select the second of said digit registers, said register means effecting the registration of the second and succeeding digits transmitted over said incoming channel in the second and succeeding ones of said digit registers, means responsive to the registration of the first digit in said first digit register for disconnecting said dial-tone source from said incoming channel, send-sequence mechanism having successive access to said digit registers, means for operating said send-sequence mechanism successively to select said digit registers, a digit sender, means for successively operating said digit sender successively to send the digits registered in successively selected ones of said digit registers, means responsive to operation of said register-sequence mechanism to select the last one of said digit registers for reconditioning said register-sequence mechanism to reselect an intermediate one of said digit registers, and means responsive to operation of said send-sequence mechanism to select the last one of said digit registers for reconnecting said dial-tone source to said incoming channel and for conditioning said send-sequence mechanism to reselect said intermediate digit register.

25. The combination set forth in claim 24, wherein said director further comprises test means repeatedly controlled following the sending of each digit therefrom for testing for the presence of a release signal upon said outgoing channel, and means governed by said test means for selectively releasing said director.

26. In a telephone system, a director comprising an incoming channel, an outgoing channel, a plurality of digit registers, a dial-tone source, a register-sequence mechanism having successive access to said digit registers, means responsive to seizure over said incoming channel for operating said register-sequence mechanism to select the first of said digit registers and for connecting said dial-tone source to said incoming channel, register means responsive to the transmission of a first digit over said incoming channel for registering the first digit in said first digit register and then for operating said register-sequence mechanism to select the second of said digit registers, said register means effecting the registration of the second and succeeding digits transmitted over said incoming channel in the second and succeeding ones of said digit registers, means responsive to the registration of the first digit in said first digit register for disconnecting said dial-tone source from said incoming channel, send-sequence mechanism having successive access to said digit registers, means for operating said send-sequence mechanism successively to select said digit registers, a digit sender, means for successively operating said digit sender successively to send the digits registered in successively selected ones of said digit registers, each of said digit registers being cleared of the digit registered therein following operation of said digit sender to send the digit registered therein, a relay, means responsive to the registration of the last digit in the last one of said digit registers for reoperating said register-sequence mechanism to reselect an intermediate one of said digit registers or to select said relay depending respectively upon whether said intermediate digit register is idle or busy, said register means being responsive to a further digit transmitted over said incoming channel to register the further digit in said selected intermediate digit register or to operate said selected relay, means responsive to operation of said relay for returning a busy signal over said incoming channel, and means responsive to sending of the last digit in said last digit register for reoperating said send-sequence mechanism to reselect said intermediate digit register in the event a further digit is registered therein.

27. In a telephone system, a director comprising an incoming channel, an outgoing channel, a primary-secondary motions switch mechanism including first and second and third wipers respectively provided with first and second and third contact banks, means responsive to first and second variable digits transmitted over said incoming channel for correspondingly operating said switch mechanism in its respective primary and secondary directions, the particular contact in said first contact bank selected by said first wiper being dependent upon the composite primary-secondary operation thereof, first contact multiples extending in the secondary direction across the rows of contacts in said second contact bank so that the particular one of said first contact multiples selected by said second wiper is dependent only upon the primary operation thereof, second contact multiples extending in the primary direction across the files of contacts in said third contact bank so that the particular one of said second contact multiples selected by said third wiper is dependent only upon the secondary operation thereof, and means governed by the particular contact selected by said first wiper for sending a corresponding first digit over said outgoing channel and governed by the particular one of said first contact multiples selected by said second wiper for sending a corresponding second digit over said outgoing channel and governed by the particular one of said second contact multiples selected by said third wiper for sending a corresponding third digit over said outgoing channel.

28. In a telephone system, a director comprising an incoming channel, an outgoing channel, a primary-secondary motions switch, a line relay selectively controllable by the impulses of variable digits transmitted over said incoming channel, a plurality of counting relays, means responsive to a first control of said line relay for imparting corresponding primary motion to said switch and for correspondingly operating said counting relays, an automatic circuit for controlling said line relay in accordance with a fixed digit, means controlled by said counting relays and governed in the event said first control of said line relay is by a predetermined first digit for preparing said automatic circuit, means controlled upon the termination of said first control of said line relay for completing said automatic circuit in the event it is prepared, means responsive to a second control of said line relay for imparting corresponding secondary motion to said switch, whereby said switch is operated either by one or two digits transmitted over said incoming channel depending upon the value of the first digit transmitted over said incoming channel, and means controlled by the composite operated position of said switch for sending one or more routing digits over said outgoing channel.

29. The combination set forth in claim 28, wherein first and second counting relays are provided so that only said first counting relay is operated by said line relay in the event the first digit transmitted over said incoming channel has a value of one and so that both said first and second counting relays are operated by said line relay in the event the first digit transmitted over said incoming channel has a value greater than one, and wherein operation of said first counting relay closes a point in said automatic circuit and operation of said second counting relay opens a series point in said automatic circuit.

No references cited.